United States Patent
Lee et al.

(10) Patent No.: US 10,143,347 B2
(45) Date of Patent: Dec. 4, 2018

(54) CLEANING DEVICE AND CONTROL METHOD THEREFOR

(71) Applicant: LG ELECTRONICS INC., Seoul (KR)

(72) Inventors: Dongkyu Lee, Seoul (KR); Kihyung Kim, Seoul (KR); Jihwan Kim, Seoul (KR); Seungkwon Ahn, Seoul (KR); Kichu Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 85 days.

(21) Appl. No.: 15/036,150

(22) PCT Filed: Jan. 9, 2014

(86) PCT No.: PCT/KR2014/000246
§ 371 (c)(1),
(2) Date: May 12, 2016

(87) PCT Pub. No.: WO2015/072623
PCT Pub. Date: May 21, 2015

(65) Prior Publication Data
US 2016/0278593 A1   Sep. 29, 2016

Related U.S. Application Data

(60) Provisional application No. 61/903,956, filed on Nov. 13, 2013.

(51) Int. Cl.
*A47L 9/28* (2006.01)
*F24F 3/16* (2006.01)
(Continued)

(52) U.S. Cl.
CPC ............... *A47L 9/2852* (2013.01); *A47L 7/00* (2013.01); *A47L 7/04* (2013.01); *A47L 9/10* (2013.01);
(Continued)

(58) Field of Classification Search
CPC .. F24F 3/1603; F24F 2221/38; F24F 2221/42; A47L 7/04; A47L 7/00;
(Continued)

(56) References Cited

U.S. PATENT DOCUMENTS

2005/0015914 A1* 1/2005 You ......................... A47L 7/04
15/319
2005/0166355 A1* 8/2005 Tani ...................... A47L 9/2805
15/319
(Continued)

FOREIGN PATENT DOCUMENTS

| GB | 2 404 138 A | 1/2005 |
|---|---|---|
| JP | 2013-22359 A | 2/2013 |

(Continued)

OTHER PUBLICATIONS

Translation of JP 2013169221.*

*Primary Examiner* — Alexander Markoff
(74) *Attorney, Agent, or Firm* — Birch, Stewart, Kolasch & Birch, LLP

(57) ABSTRACT

Provided is a cleaning device comprising: a camera unit for capturing an image; a cleaning unit for cleaning; an air purification unit for purifying air; a driving unit for moving the cleaning device; and a processor for controlling the camera unit, the cleaning unit, the air purification unit and the driving unit, wherein the processor detects a user by using the camera unit, cleans by moving the cleaning device to a position exceeding a first threshold distance from the detected user when the cleaning device is in a cleaning
(Continued)

mode, and purifies the air by moving the cleaning device to a position within a second threshold distance from the detected user when the cleaning device is in an air purification mode.

14 Claims, 17 Drawing Sheets

(51) Int. Cl.
 *G05D 1/02* (2006.01)
 *A47L 7/00* (2006.01)
 *A47L 9/10* (2006.01)
 *A47L 7/04* (2006.01)

(52) U.S. Cl.
 CPC ......... *F24F 3/1603* (2013.01); *G05D 1/0246* (2013.01); *A47L 2201/04* (2013.01); *F24F 2221/38* (2013.01); *F24F 2221/42* (2013.01); *G05D 2201/0215* (2013.01)

(58) Field of Classification Search
 CPC ...... A47L 2201/04; A47L 9/2852; A47L 9/10; G05D 1/0246; G05D 2201/0215
 See application file for complete search history.

(56) References Cited

U.S. PATENT DOCUMENTS

| | | | | |
|---|---|---|---|---|
| 2005/0171636 A1* | 8/2005 | Tani | ..................... | G05D 1/0276 700/245 |
| 2005/0273226 A1* | 12/2005 | Tani | ..................... | G01C 21/00 701/23 |
| 2005/0288079 A1* | 12/2005 | Tani | ..................... | A63F 9/001 463/1 |
| 2007/0250212 A1* | 10/2007 | Halloran | ................... | A47L 5/30 700/245 |
| 2008/0193328 A1* | 8/2008 | Crapser | ..................... | A61L 9/04 422/5 |
| 2009/0198380 A1* | 8/2009 | Friedman | ................ | A47L 9/009 700/259 |
| 2013/0060379 A1* | 3/2013 | Choe | ..................... | G06N 3/008 700/245 |
| 2013/0184980 A1* | 7/2013 | Ichikawa | ............... | B25J 9/1676 701/301 |
| 2014/0230179 A1* | 8/2014 | Matsubara | ................ | A47L 7/04 15/319 |
| 2014/0303775 A1* | 10/2014 | Oh | ....................... | G05D 1/0016 700/253 |

FOREIGN PATENT DOCUMENTS

| | | | | |
|---|---|---|---|---|
| JP | 5165784 B1 | * | 3/2013 | ............... A47L 7/04 |
| JP | 2013169221 A | * | 9/2013 | |
| KR | 10-2003-0039465 A | | 5/2003 | |
| KR | 20-0333880 Y1 | | 11/2003 | |
| KR | 10-2005-0012049 A | | 1/2005 | |
| KR | 10-0657736 B1 | | 12/2006 | |
| KR | 10-0781089 B1 | | 11/2007 | |
| KR | 10-2007-0118578 A | | 12/2007 | |
| KR | 10-081228 B1 | | 3/2008 | |
| KR | 10-2012-0122700 A | | 11/2012 | |
| KR | 10-2013-0015372 A | | 2/2013 | |

\* cited by examiner

FIG. 1
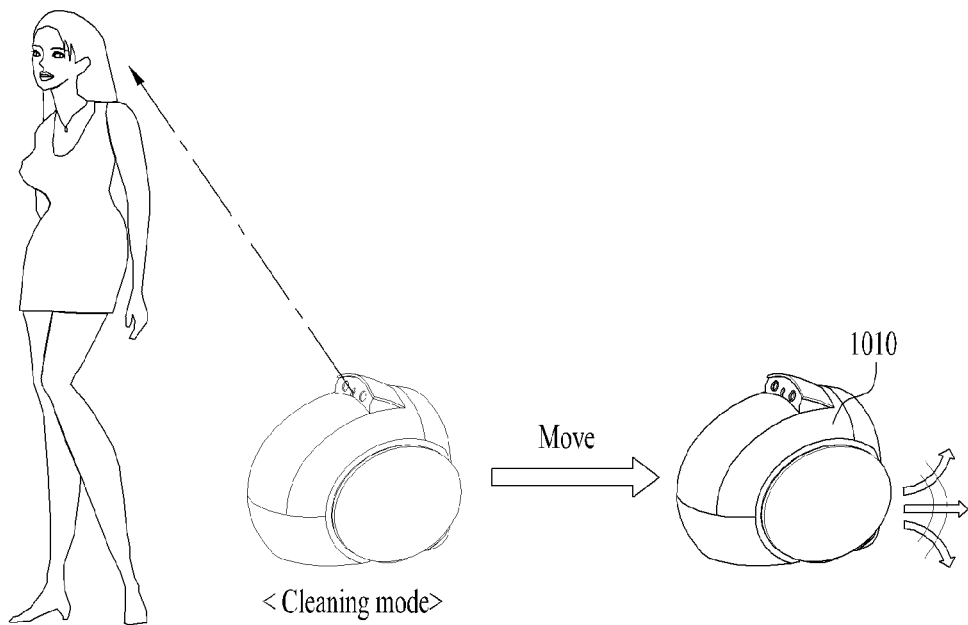
<Cleaning mode>
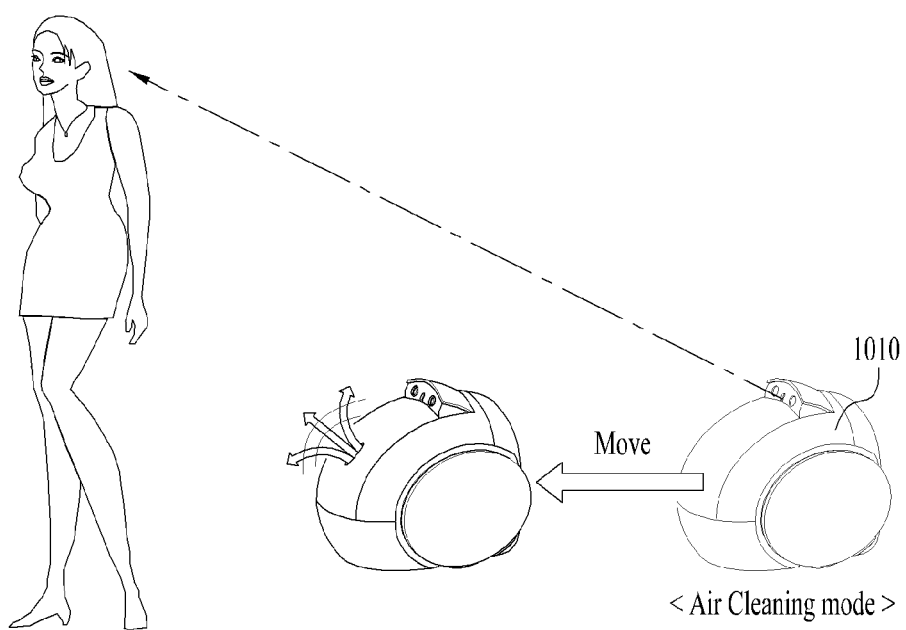
< Air Cleaning mode >

FIG. 2
(1) Front View
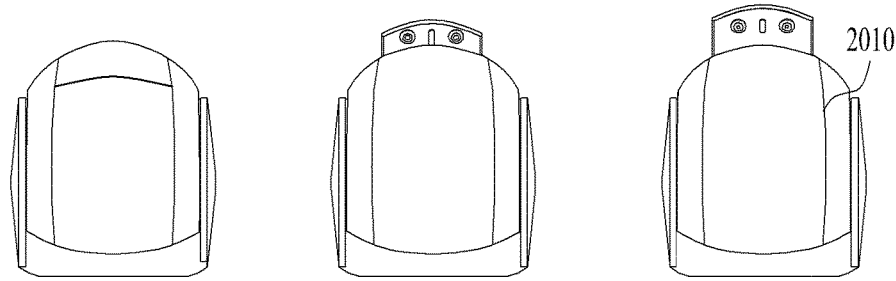
(2) Side View
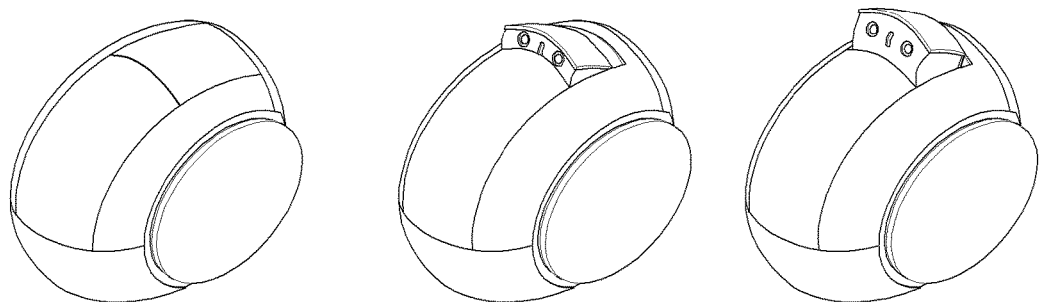
(3) Detailed Veiw
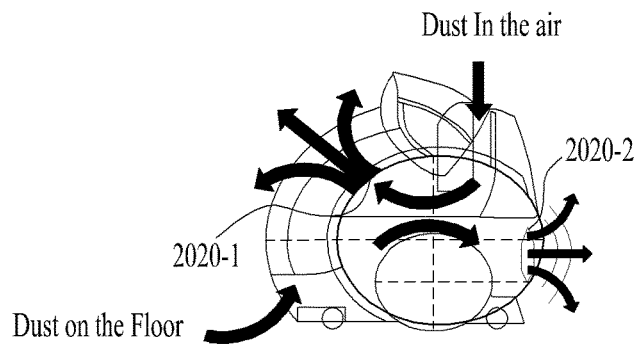

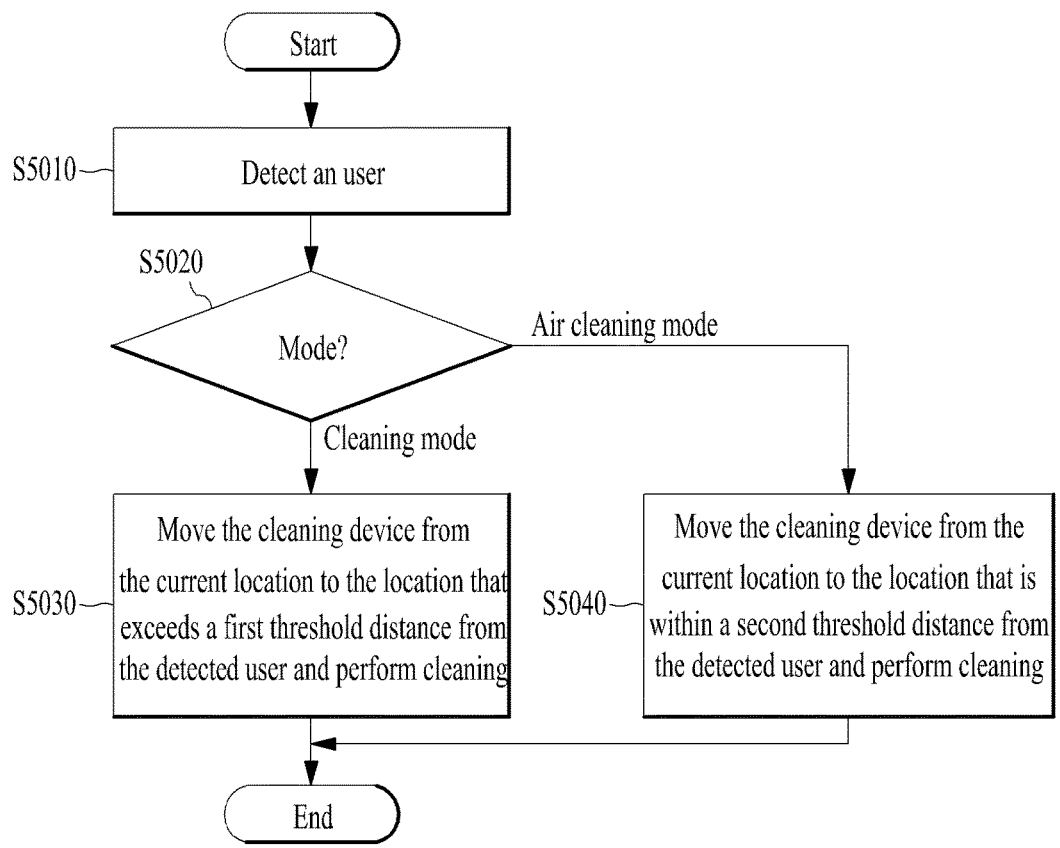

Measure user's area of activity

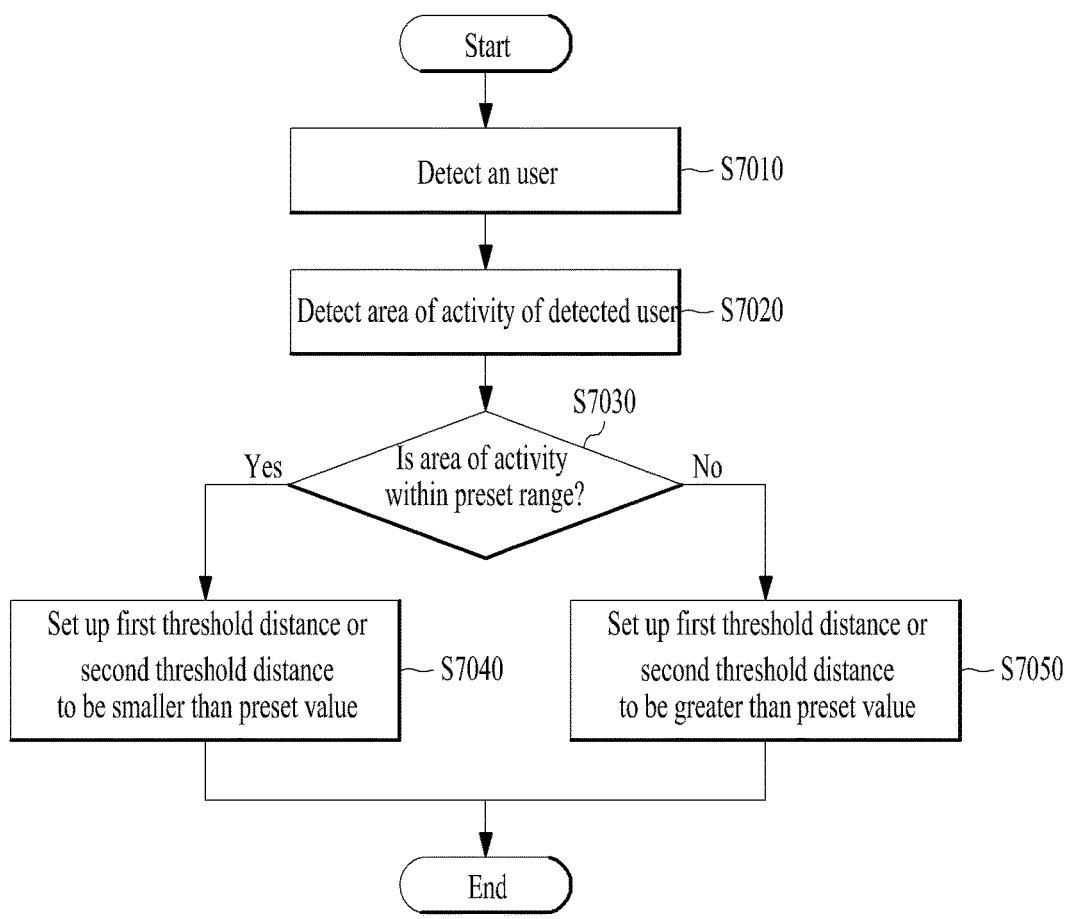

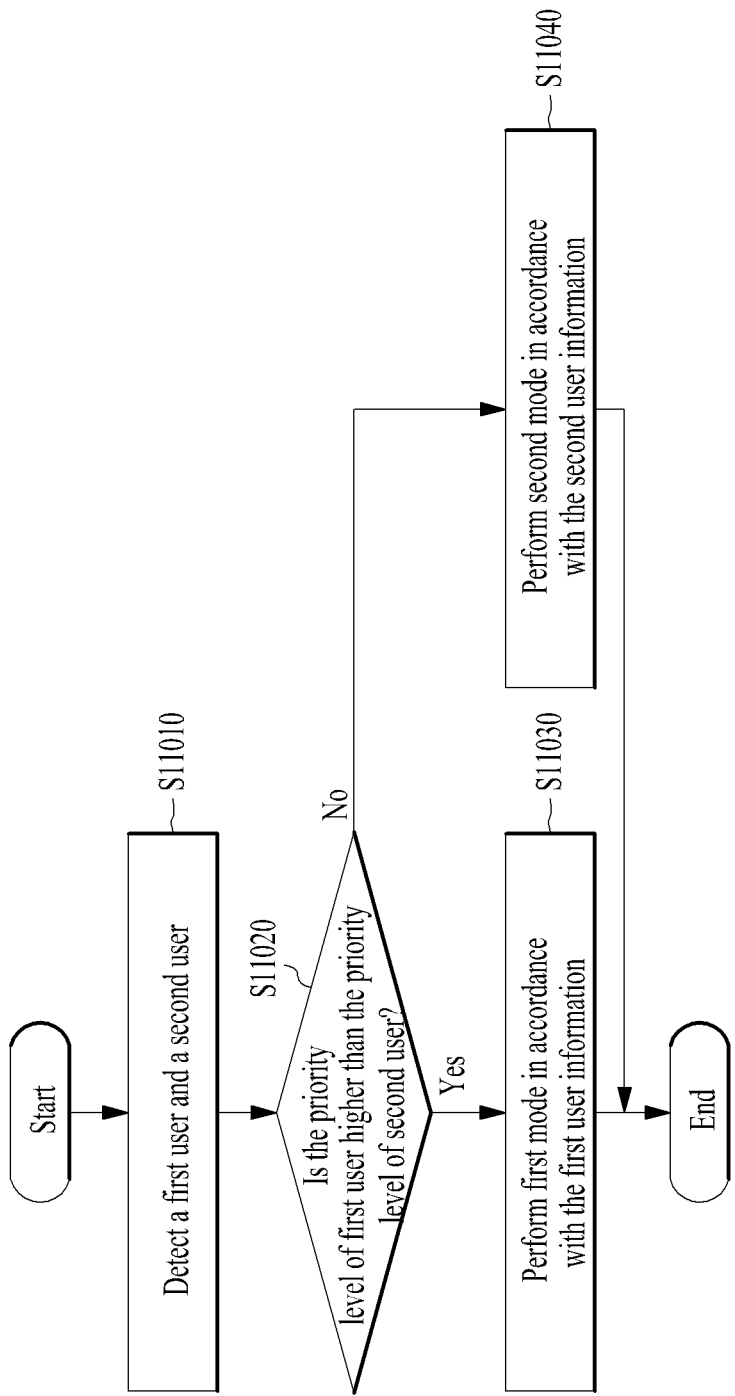

CLEANING DEVICE AND CONTROL METHOD THEREFOR

CROSS REFERENCE TO RELATED APPLICATIONS

This application is the National Phase of PCT International Application No. PCT/KR2014/000246, filed on Jan. 9, 2014, which claims priority under 35 U.S.C. 119(e) to U.S. Provisional Application No. 61/903,956, filed on Nov. 13, 2013, all of which are hereby expressly incorporated by reference into the present application.

FIELD OF THE INVENTION

This specification relates to a cleaning device and, more particularly, to a cleaning device and a control method therefor that can consistently maintain a preset (or predetermined) distance with a user in accordance with an operation mode it is performing.

BACKGROUND ART

Recently, the interest in health has been rising. And, accordingly, the development of cleaning devices performing cleaning has been growing at a fast rate. With the evolution of the cleaning devices, the development of cleaning devices providing a cleaning function and providing an air cleaning function (or air purifying function) both at the same time is also being actively carried out. In this specification, a cleaning device may represent a device performing cleaning and air purification (or air cleaning) while moving around on its own.

However, problems existed in the conventional cleaning devices in that by performing cleaning or air cleaning (or air purification) without considering its distance from the user, efficient cleaning or air cleaning could not be provided.

DETAILED DESCRIPTION OF THE INVENTION

Technical Objects

According to an exemplary embodiment, provided herein is a cleaning device that can adjust its distance from a user in accordance with its mode, which the cleaning device intends to perform.

According to another exemplary embodiment, provided herein is a cleaning device that can detecting the user's area of activity and set up a threshold distance from the user based on the detected area of activity of the user.

According to another exemplary embodiment, provided herein is a cleaning device that can decide the mode, which the cleaning device intends to perform, based on received user information.

According to another exemplary embodiment, provided herein is a cleaning device that can decide a direction of an air outlet port respective to the user in accordance with the mode, which is being performed by the cleaning device.

According to another exemplary embodiment, provided herein is a cleaning device that transmits mode information to an external device.

Technical Solutions

In order to resolve the problems that are described above, according to an exemplary embodiment, as a cleaning device, provided herein is a cleaning device including a camera unit capturing images; a cleaning unit performing cleaning; an air cleaning unit performing air cleaning; a driving unit moving the cleaning device; and a processor controlling the camera unit, the cleaning unit, the air cleaning unit, and the driving unit, wherein the processor detects a user by using the camera unit, in case the cleaning device is in a cleaning mode, performs cleaning by moving the cleaning device to a location, wherein its distance from the detected user exceeds a first threshold distance, and, in case the cleaning device is in an air cleaning mode, performs air cleaning by moving the cleaning device to a location, wherein its distance from the detected user is within a second threshold distance.

Effects of the Invention

According to an exemplary embodiment, since the cleaning device adjusts its distance from the user or the direction of the air outlet port in accordance with the mode it is performing, by discharging air that is generated as a result of performing cleaning further away from the user, any unpleasant feeling of the user caused by the corresponding air may be eliminated, and by discharging clean air (or purified air) that is generated as a result of performing air cleaning (or air purification) closer to the user, clean air may be immediately provided to the user.

Additionally, according to another exemplary embodiment, since the cleaning device detects the area of activity of the user and sets up a threshold distance from the user accordingly, any danger of colliding with the user may be efficiency reduced.

Additionally, according to another exemplary embodiment, since the cleaning device decides the mode, which the cleaning device intends to perform, based on user information, user-adaptive or user-friendly cleaning function or air cleaning function may be provided.

According to another exemplary embodiment, since the cleaning device transmits mode information to an external device, the user may easily be provided with mode information of the cleaning device through the external device, and, since the user is capable of giving control commands of the cleaning device through the external device, accessibility and portability respective to the cleaning device may be increased.

More detailed effects of the present invention will hereinafter be described in detail in the following description.

BRIEF DESCRIPTION OF THE DRAWINGS

FIG. 1 illustrates a cleaning device controlling a driving unit in accordance with a mode of the cleaning device according to an exemplary embodiment of the present invention.

FIG. 2 illustrates a cleaning device according to an exemplary embodiment of the present invention.

FIG. 5 illustrates a flow chart of a method for controlling a cleaning device that maintains a preset distance from a user in accordance with the operation mode it is performing as an exemplary embodiment of the present invention.

FIG. 7 illustrates a flow chart of a method for controlling a cleaning device that sets up a threshold distance by detecting an area of activity of a user as an exemplary embodiment of the present invention.

FIG. 11B illustrates a flow chart of a method for controlling a cleaning device that decides the mode that is to be performed with respect to priority levels of multiple users, when the cleaning device detects multiple users, according to an exemplary embodiment of the present invention.

BEST MODE FOR CARRYING OUT THE PRESENT INVENTION

Figure 3:
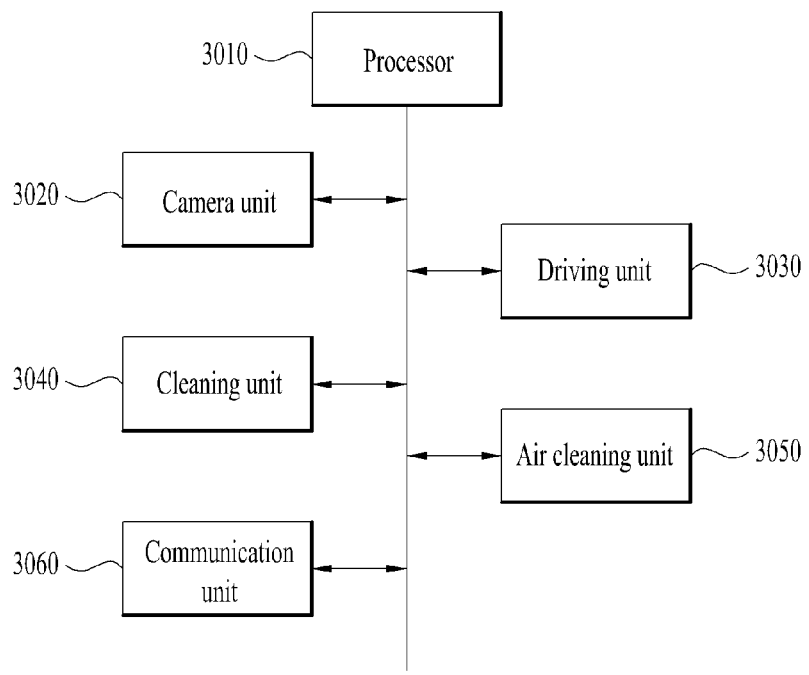
FIG. 3 illustrates a block view showing a cleaning device according to an exemplary embodiment of the present invention.

Wherever possible, although the terms used in this specification are selected from generally known and used terms based upon functions of this specification, the terms used herein may be varied or modified in accordance with the intentions or general practice of anyone skilled in the art, or along with the advent of a new technology. Additionally, in some particular cases, some of the terms mentioned in the description of this specification may be selected by the applicant at his or her discretion, the detailed meanings of which are described in relevant parts of the description of the exemplary embodiments. Furthermore, it is required that the terms of the present invention are to be defined, not simply by the actual terms used but also by the meaning of each term lying within, and also based upon the overall content of the present invention.

Furthermore, although the exemplary embodiments will hereinafter be described in detail with reference to the accompanying drawings and the details indicated in the accompanying drawings, the present invention will not be limited only to the exemplary embodiments presented herein.

FIG. 1 illustrates a cleaning device controlling a driving unit in accordance with a mode of the cleaning device according to an exemplary embodiment of the present invention.

The cleaning device (1010) of this specification may control a driving unit in accordance with a mode, which is performed by the cleaning device (1010). More specifically, the cleaning device (1010) may control the driving unit so that the cleaning device (1010) can consistently maintain a preset (or predetermined) distance from the user in accordance with the mode, which is performed by the cleaning device (1010). Herein, the mode may include a cleaning mode and an air cleaning mode (or air purifying mode).

For example, if cleaning device (1010) is operating in the cleaning mode, the cleaning device (1010) may maintain its distance from the user by exceeding a first threshold distance. Herein, the cleaning mode may represent a mode of performing cleaning by using a cleaning unit that is equipped in the cleaning device (1010). Alternatively, in case the cleaning device (1010) is operating in the air purifying mode, the cleaning device (1010) may maintain its distance from the user to a range within a second threshold distance. Herein, the air cleaning mode may represent a mode performing air cleaning by using an air cleaning unit, which is equipped in the cleaning device (1010).

More detailed description of this exemplary embodiment will hereinafter be described with reference to FIG. 4A and FIG. 4B.

FIG. 2 illustrates a cleaning device according to an exemplary embodiment of the present invention. More specifically, FIG. 2-(1) illustrates a front view of the cleaning device (1010), FIG. 2-(2) illustrates a perspective view of the cleaning device (1010), and FIG. 2-(3) illustrates an internal structure of the cleaning device (1010).

As an exemplary embodiment, the cleaning device (2010) of this specification may be designed to have the form shown in FIG. 2. As shown in the drawing, the cleaning device (2010) may be provided with two camera units aligned one next to the other on an upper side of the cleaning device. Such camera units may be seen as the eyes of the cleaning device (2010). As described above, by communicating with the cleaning device (2010) through the camera units, which look like its eyes, the user may be under the impression of carrying out a conversation with the cleaning device (2010). Additionally, the user may also be under the impression of giving orders to perform cleaning to a specific target, such as a pet animal or a toy robot. More specifically, due to its user-friendly design, the cleaning device (2010) may attract the attention of the user, and, accordingly, the user may be emotionally stimulated.

In addition to this, the cleaning device (2010) may be embodied in diverse designs, and the exemplary embodiment of the cleaning device (2010) will not be limited only to the form shown in the drawing.

Meanwhile, in addition to providing the cleaning function, the cleaning device (2010) of this specification may also provide an air cleaning function. Accordingly, as shown in FIG. 2-(3), the cleaning device (2010) may be equipped with a first intake port sucking in air in a lower part of the cleaning device (2010) for cleaning the floor, and a second intake port sucking in air in an upper part of the cleaning device (2010) for cleaning (or purifying) the air. At this point, in order to blow out (or discharge) the air respectively taken in through the first intake port and the second intake port, the cleaning device (2010) may be equipped with a first outlet port (2020-2) and a second outlet port (2020-1). In case the cleaning device (2010) has sucked in air through the first intake port, the cleaning device (2010) may remove dust from the sucked-in air and may discharge the air having the dust removed therefrom (or the dust-removed air) through the first outlet port (2020-2). Additionally, in case the cleaning device (2010) has sucked in air through the second intake port, the cleaning device (2010) may clean (or purify) the sucked-in air and may discharge the cleaned air (or purified air) through the second outlet port (2020-1).

Detailed description on the cleaning performance and the air cleaning performance of the above-described cleaning device (2010) will be described in more detail later on with reference to FIG. 4A and FIG. 4B.

FIG. 3 illustrates a block view showing a cleaning device according to an exemplary embodiment of the present invention. As shown in this drawing, the cleaning device may include a processor (3010), a camera unit (3020), a driving unit (3030), a cleaning unit (3040), an air cleaning unit (3050), and a communication unit (3060).

The camera unit (3020) may capture images. More specifically, the camera unit (3020) may capture an image within an area of its angle of view by using at least one camera sensor, which is equipped in the cleaning device. Furthermore, the camera unit (3020) may deliver the captured result to the processor (3010). The processor (3010) may detect a user by using the camera unit (3020) and may adjust its distance from the user accordingly.

The respective detailed description will be described in more detail later on with reference to FIG. 4a and FIG. 4b. Additionally, the processor (3010) may detect the user by using the camera unit (3020) so as to switch (or shift) its mode (or operation mode), and, the respective detailed description will be described in more detail later on with reference to FIG. 10A to FIG. 11B.

The driving unit (3030) may move the cleaning device. At this point, the driving unit (3030) may include at least one wheel for the movement of the cleaning device. The processor (3010) may move the cleaning device by controlling the at least one wheel, which is included in the driving unit (3030). The processor (3010) may control the driving unit (3020) based on a pre-stored navigation algorithm and a sensing result gained through a sensor, thereby being capable of moving the cleaning device.

The cleaning unit (3040) may perform cleaning according to command from the processor (3010). More specifically, the cleaning unit (3040) may perform cleaning by sucking in polluted air existing on the floor, and, then, by filtering out dust from the sucked-in air and discharging (or blowing out) the filtered air. At this point, the cleaning unit (3040) may include a first intake port for sucking in the polluted air, a dust cleaning duct for processing dust, and a first outlet port for discharging the dust-processed air.

At this point, the dust cleaning duct may include a first filter for filtering the sucked-in dust. Herein, the first filter may represent a dust cleaning filter, which filters out dust particles.

The air cleaning unit (3050) may perform air cleaning (or air purification). More specifically, the air cleaning unit (3050) may perform air cleaning by sucking in polluted air existing near the upper portion, and, then, by filtering out pollutants from the sucked-in air and discharging (or blowing out) the filtered air. At this point, the air cleaning unit (3050) may include a second intake port for sucking in the polluted air, an air cleaning duct for processing pollutants, and a second outlet port for discharging the pollutant-processed air. At this point, the air cleaning duct may include a second filter for filtering the sucked-in pollutants. Herein, the second filter may represent an air cleaning filter, such as anti-bacterial filter, deodorizing filter, and so on.

The communication unit (3060) performs communication with an external device and/or a web server by using diverse protocols, and, by doing so, the communication unit (3060) may transmit/receive information. Most particularly, the communication unit (3060) may transmit/receive cleaning information corresponding to the cleaning mode and/or air cleaning information respective to the air cleaning mode to/from the external device. In order to do so, the communication unit (3060) may perform pairing with an external device, which corresponds to the communication target of the communication unit (3060). The respective detailed description will be described in more detail later on with reference to FIG. 12A to FIG. 13. Additionally, the communication unit (3060) may transmit/receive user information corresponding to a user that is detected through the camera unit (3020) to/from the web server or the external device.

Meanwhile, although it is not shown in the block diagram, the cleaning device may be optionally equipped with a storage unit (not shown). The storage unit may store digital information, such as audio, image, video, text, and so on. The storage unit may represent diverse types of digital data storage space, such as flash memory, RAM (Random Access Memory), SSD (Solid State Drive), and so on.

The processor (3010) may control at least one unit being equipped in the cleaning device. More specifically, the processor (3010) controls each of the above-described units, and the processor (3010) may control the data transmission and/or reception between each of the units.

Specifically, in this specification, the processor (3010) may control each of the above-described units in accordance with the mode of the cleaning device. As an exemplary embodiment, in case the cleaning device is operating in the cleaning mode, the processor (3010) may perform cleaning by controlling at least one of the camera unit (3020), the cleaning unit (3040), and the driving unit (3030). Detailed description of this exemplary embodiment will be described in more detail later on with reference to FIG. 4A and FIG. 8B. As another exemplary embodiment, in case the cleaning device is operating in the air cleaning mode, the processor (3010) may perform air cleaning (or air purification) by controlling at least one of the camera unit (3020), the air cleaning unit (3050), and the driving unit (3030). Detailed description of this exemplary embodiment will be described in more detail later on with reference to FIG. 4B and FIG. 8B.

Additionally, the processor (3010) may decide a mode of the cleaning device in accordance with the received user information. More specifically, the processor (3010) may receive user information corresponding to the user that has been detected by using the camera unit (3020). The processor (3010) may then decide the mode of the cleaning device based on the received user information. Detailed description of this exemplary embodiment will be described in more detail later on with reference to FIG. 10A to FIG. 11B.

Hereinafter, it may be expressed that the processor (3010) controls the cleaning device or at least one of the units of the cleaning device in accordance with the user input, and the processor (3010) and the cleaning device may be viewed as equivalents.

Meanwhile, the cleaning device shown in FIG. 3 corresponds to a block diagram according to an exemplary embodiment, and, herein, the separately illustrated blocks respectively show the units of the cleaning device, which are logically differentiated from one another. Accordingly, the units of the above-described cleaning device may be mounted as a single chip or as multiple chips depending on the design of the cleaning device.

Figure 4A:
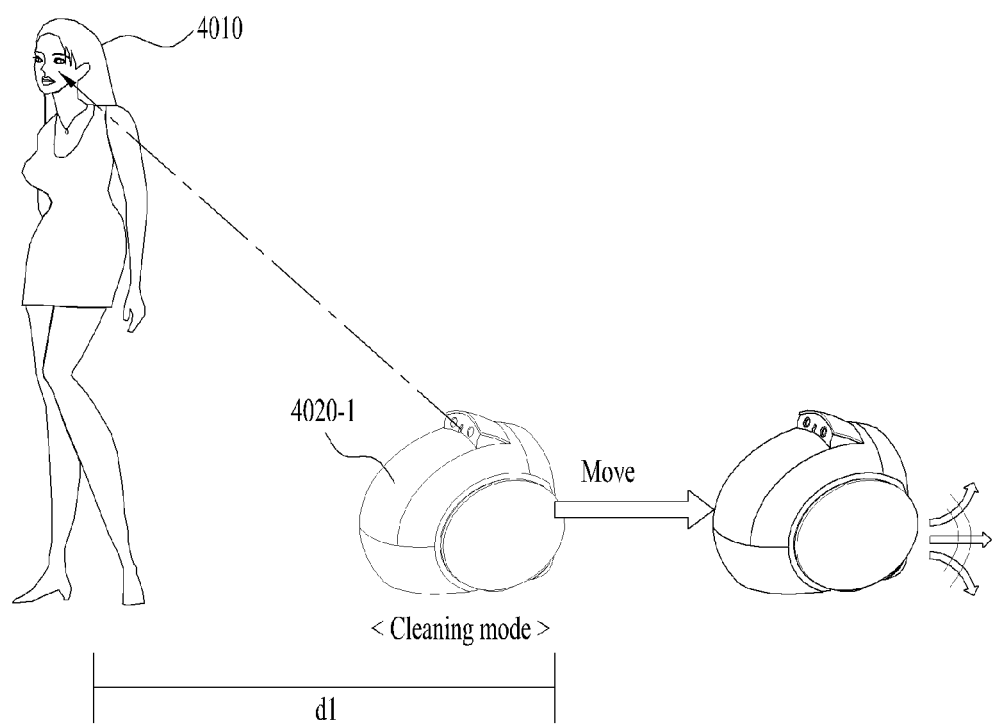
FIG. 4A illustrates a cleaning device according to an exemplary embodiment of the present invention, when the operation mode of the cleaning device is a cleaning mode.

FIG. 4A illustrates a cleaning device according to an exemplary embodiment of the present invention, when the operation mode of the cleaning device is a cleaning mode.

More specifically, FIG. 4A illustrates a cleaning device (4020-1) performing cleaning while consistently maintaining a preset distance with a user (4010). In this specification, a user (4010) not only refers to a person who has activated the cleaning device (4020-1) but also refers to another person positioned within a preset radius from the cleaning device (4020-1).

If the cleaning device (4020-1) is in the cleaning mode, the cleaning device (4020-1) may maintain a distance from the user (4010) that exceeds a first threshold distance (d1). In other words, the cleaning device (4020-1) may perform cleaning while maintaining a distance from the user (4010) that exceeds the first threshold distance (d1). By doing so, the cleaning device (4020-1) may minimize noise or unpleasant feeling, and so on, that may be delivered to the user (4010).

In order to do so, the cleaning device (4020-1) operating in the cleaning mode may first detect the user (4010) by using a camera unit. At this point, the cleaning device (4020-1) may be additionally equipped with diverse sensors, such as an infrared sensor, a proximity sensor, a heat sensor, a motion sensor, and/or a gesture sensor, and so on, which may be used for detecting the user (4010).

When the user (4010) is detected, the cleaning device (4020-1) may maintain its distance from the user (4010) that exceeds the first threshold distance (d1). More specifically, when the distance between the user (4010) and the cleaning device (4020-1) is detected to be within the first threshold distance (d1), the cleaning device (4020-1) may move to a location that exceeds the first threshold distance (d1) from the detected user (4010). When the movement to the corresponding location is completed, the cleaning device (4020-1) may perform cleaning.

On the contrary, when the distance between the user (4010) and the cleaning device (4020-1) is detected to exceed the first threshold distance (d1), the cleaning device (4020-1) may immediately perform cleaning without having to move. Meanwhile, the first threshold distance (d1) mentioned herein may correspond to a distance personally inputted to the cleaning device (4020-1) by the user (4010) or may correspond to a distance that has been preset in advance by the manufacturer during the manufacturing process of the cleaning device (4020-1).

Even while performing cleaning, the cleaning device (4020-1) may detect its distance from the user (4010) in real time, thereby maintaining the distance to exceed the first threshold distance (d1). Therefore, as the user (4010) moves, the cleaning device (4020-1) may also move accordingly. For example, when the user (4010) moves from a first location to a second location, the cleaning device (4020-1) may also move to a location exceeding the first threshold distance (d1) from the second location.

In order to more effectively maintain its distance from the user (4010), the cleaning device (4020-1) may additionally detect the area of activity of the user (4010). The cleaning device (4020-1) may change the first threshold distance (d1) value by additionally detecting the area of activity of the user (4010), and, herein, the respective detailed description will be described in more detail later on with reference to FIG. 6 and FIG. 7.

Figure 4B:
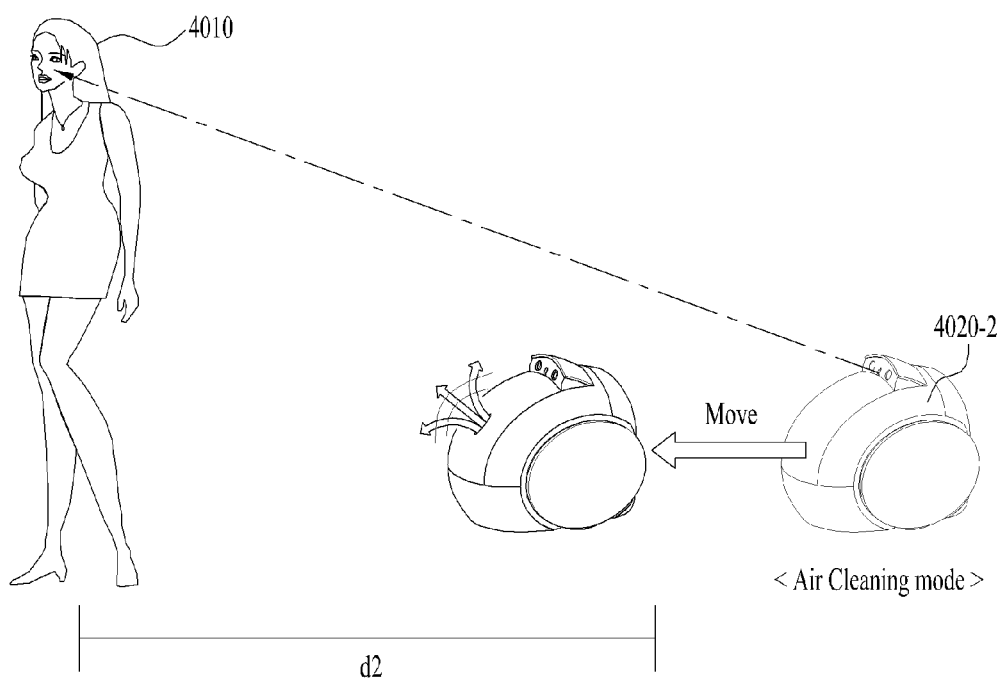
FIG. 4B illustrates a cleaning device according to an exemplary embodiment of the present invention, when the operation mode of the cleaning device is an air cleaning mode.

FIG. 4B illustrates a cleaning device according to an exemplary embodiment of the present invention, when the operation mode of the cleaning device is an air cleaning mode.

More specifically, FIG. 4B illustrates a cleaning device (4020-2) performing air cleaning while consistently maintaining a preset distance with a user (4010).

If the cleaning device (4020-2) is in the air cleaning mode, the cleaning device (4020-2) may maintain a distance from the user (4010) that is within a second threshold distance (d2). In other words, the cleaning device (4020-2) may perform air cleaning while maintaining a distance from the user (4010) that is within the second threshold distance (d2). By doing so, the cleaning device (4020-2) may directly provide clean air to the user (4010) at a close range.

In order to do so, the cleaning device (4020-2) operating in the air cleaning mode may first detect the user (4010) by using a camera unit. The respective detailed description has already been described above in detail with reference to FIG. 4A.

When the user (4010) is detected, the cleaning device (4020-2) may maintain its distance from the user (4010) that is within the second threshold distance (d2). More specifically, when the distance between the user (4010) and the cleaning device (4020-2) is detected to exceed the second threshold distance (d2), the cleaning device (4020-2) may move to a location that is within the second threshold distance (d2) from the detected user (4010). When the movement to the corresponding location is completed, the cleaning device (4020-2) may perform air cleaning.

On the contrary, when the distance between the user (4010) and the cleaning device (4020-2) is detected to be within the second threshold distance (d2), the cleaning device (4020-2) may immediately perform air cleaning without having to move.

Herein, the second threshold distance (d2) mentioned herein may correspond to a distance personally inputted to the cleaning device (4020-2) by the user (4010) or may correspond to a distance that has been preset in advance by the manufacturer during the manufacturing process of the cleaning device (4020-2). Additionally, the second threshold distance (d2) may correspond to the same distance as the first threshold distance (d1), which is described above with reference to FIG. 4A.

Even while performing air cleaning, the cleaning device (4020-2) may detect its distance from the user (4010) in real time, thereby maintaining the distance to be within the second threshold distance (d2). Therefore, as the user (4010) moves, the cleaning device (4020-2) may also move accordingly.

For example, when the user (4010) moves from a first location to a second location, the cleaning device (4020-2) may also move to a location being within the second threshold distance (d2) from the second location.

Moreover, in addition to the second threshold distance (d2), the cleaning device (4020-2) may additionally set up a third threshold distance, thereby being capable of adjusting its distance from the user (4010). In other words, in case the cleaning device (4020-2) is located too close to the user (4010), this may block the path of the user (4010).

Therefore, by additionally setting up a third threshold distance, the cleaning device (4020-2) may perform air cleaning in a location exceeding the third threshold distance and being within the second threshold distance (d2) from the user (4010).

Meanwhile, in order to more effectively maintain its distance from the user (4010), the cleaning device (4020-2) may additionally detect the area of activity of the user (4010). The cleaning device (4020-2) may change the second threshold distance (d2) value by additionally detecting the area of activity of the user (4010), and, herein, the respective detailed description will be described in more detail later on with reference to FIG. 6 and FIG. 7.

FIG. 5 illustrates a flow chart of a method for controlling a cleaning device that maintains a preset distance from a user in accordance with the operation mode it is performing as an exemplary embodiment of the present invention.

In this flow chart, the detailed description on parts that are similar to or that overlap with the detailed description provided above with reference to FIG. 1 to FIG. 4B will be omitted.

First of all, the cleaning device may detect the user (S5010).

More specifically, the cleaning device may detect a user that is positioned within a preset radius from the cleaning device. At this point, in addition to the camera unit, the cleaning device may detect the user by using an infrared sensor, a proximity sensor, a heat sensor, a motion sensor, and/or a gesture sensor, and so on.

Subsequently, the cleaning device may detect the operation mode of the cleaning device (S5020).

Herein, the mode may include a cleaning mode and an air cleaning mode. The cleaning device may detect the mode based on a user input respective to the cleaning device and/or received user information. The method for detecting the mode based on the user information will be described in more detail later on with reference to FIG. 10A and FIG. 10B.

If the cleaning mode is detected as the mode of the cleaning device, the processor may move the cleaning device from the current location to the location that exceeds a first threshold distance from the detected user and perform cleaning (S5030).

More specifically, when the distance between the detected user and the cleaning device is detected to be within the first threshold distance, the cleaning device may move to a location that exceeds the first threshold distance from the detected user. When the movement to the corresponding location is completed, the processor may perform cleaning.

On the contrary, when the distance between the user and the cleaning device is detected to exceed the first threshold distance, the processor may immediately perform cleaning without having to move.

If the air cleaning mode is detected as the mode of the cleaning device, the processor may move the cleaning device from the current location to the location that is within the second threshold distance from the detected user and perform cleaning (S5040). More specifically, when the distance between the user and the cleaning device is detected to exceed the second threshold distance, the processor may move to a location that is within the second threshold distance from the detected user. When the movement to the corresponding location is completed, the processor may perform air cleaning. Conversely, when the distance between the user and the cleaning device is detected to be within the second threshold distance, the processor may immediately perform air cleaning without having to move.

Figure 6:
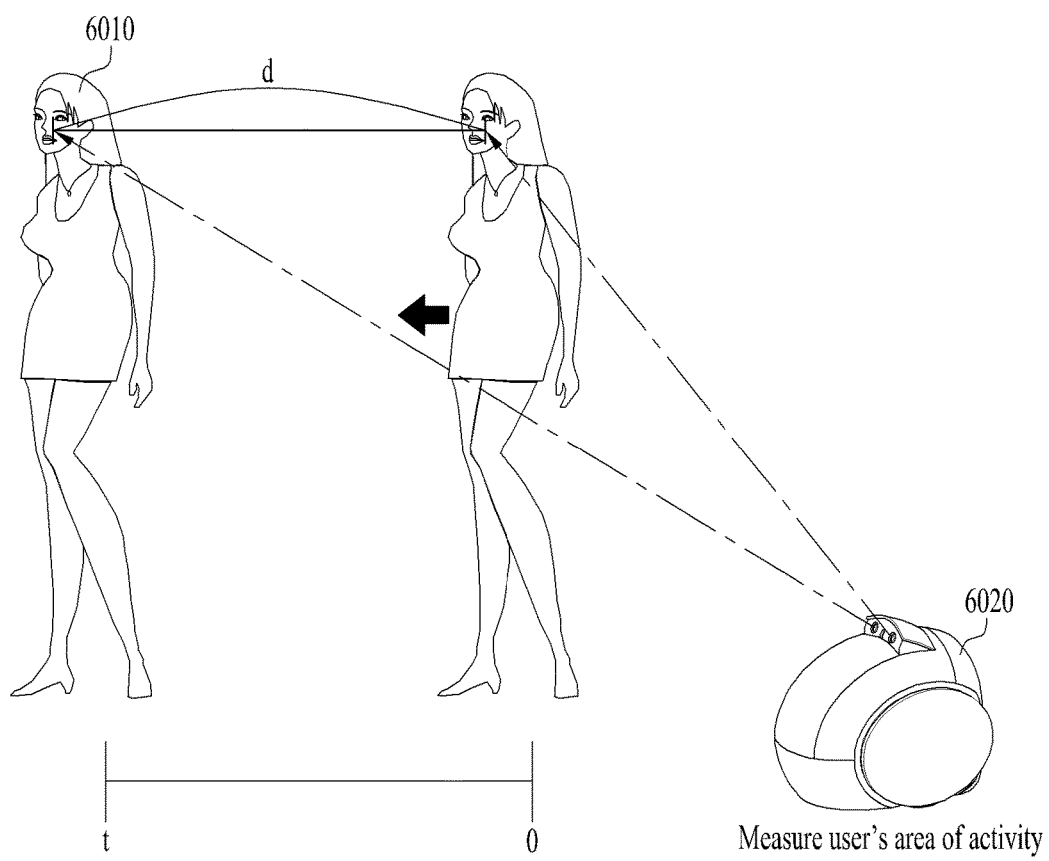
FIG. 6 illustrates a cleaning device that sets up a threshold distance by detecting an area of activity of a user according to an exemplary embodiment of the present invention.

FIG. 6 illustrates a cleaning device that sets up a threshold distance by detecting an area of activity of a user according to an exemplary embodiment of the present invention.

As described above with reference to FIG. 4A and FIG. 4B, the cleaning device (6020) may consistently maintain a distance from the user (6010) when performing each mode. At this point, in order to more effectively maintain its distance from the user (6010), the cleaning device (6020) may detect an area of activity (d) of the user (6010) and may, then, set up a threshold distance value based on the area of activity (d).

Herein, the area of activity (d) may indicate an amount (or distance) moved by the user (6010) during a preset period of time (t). The cleaning device (6020) may detect the user (6010) by using the camera unit and, at the same time, the cleaning device (6020) may additionally detect the area of activity (d) of the user (6010). At this point, in addition to the camera unit, the cleaning device (6020) may detect the area of activity (d) of the user (6010) by using an infrared sensor, a proximity sensor, a heat sensor, a motion sensor, and/or a gesture sensor, and so on.

This is because, in case the user (6010) carries out an activity having a small area of activity (d), such as watching TV or sleeping (or taking a nap), even if the threshold distance is set to a small value, this does not block the path or movement of the user (6010).

On the contrary, if the user (6010) carries out an activity having a large area of activity (d), such as working out (or exercising) or walking, if the threshold distance is set to a small value, this may block the path or movement of the user (6010), and, accordingly, there is a risk of colliding with the cleaning device (6020). Therefore, in case the activity having a large area of activity (d) is detected, the cleaning device (6020) may set the threshold distance to a large value. In other words, the cleaning device (6020) may set the threshold distance in proportion to the area of activity (d) of the user (6010).

More specifically, in case the detected area of activity (d) of the user (6010) is within a preset range, the cleaning device (6020) may set the threshold distance to a value that is smaller than a preset value. In other words, in case the detected area of activity (d) of the user (6010) is within a preset range, the cleaning device (6020) may set the first threshold value or the second threshold value to a value smaller than the preset value.

On the contrary, if the detected area of activity (d) of the user (6010) deviates from a preset range, the cleaning device (6020) may set the threshold distance to a value that is greater than a preset value. In other words, in case the detected area of activity (d) of the user (6010) deviates from a preset range, the cleaning device (6020) may set the first threshold value or the second threshold value to a value greater than the preset value.

The cleaning device (6010) may perform the cleaning mode or the air cleaning mode by using the threshold distance, which is set up based on area of activity (d) of the user (6010). This exemplary embodiment may be applied to a case when both the cleaning mode and the air cleaning mode are performed.

Meanwhile, although it is not shown in the drawing, a reference point of the first threshold distance and the second threshold distance may be determined (or set up) based on the area of activity of the user. More specifically, after detecting the area of activity of the user, the cleaning device may designate the detected area of activity of the user as the starting point, so as to determine (or set up) the first threshold distance or the second threshold distance.

FIG. 7 illustrates a flow chart of a method for controlling a cleaning device that sets up a threshold distance by detecting an area of activity of a user as an exemplary embodiment of the present invention. In this flow chart, the detailed description on parts that are similar to or that overlap with the detailed description provided above with reference to FIG. 1 to FIG. 6 will be omitted.

First of all, the cleaning device may detect the user (S7010).

At this point, in addition to the camera unit, the cleaning device may detect the user by using an infrared sensor, a proximity sensor, a heat sensor, a motion sensor, and/or a gesture sensor, and so on.

Subsequently, the cleaning device may detect the area of activity of the detected user (S7020).

Herein, the area of activity may indicate an amount (or distance) moved by the user during a preset period of time (t). The fact that this is to more effectively maintain the distance from the user has already been described above with reference to FIG. 6.

Thereafter, the cleaning device may determine whether or not the detected area of activity is within the predetermine range (S7030). Herein, the preset range may correspond to a range that is personally inputted by the user or may correspond to a range that has been preset in advance by the manufacturer during the manufacturing process of the cleaning device.

If the area of activity is detected to be within the preset range, the cleaning device may set the first threshold distance or the second threshold distance to a value that is less than the preset value (S7040).

If the area of activity of the user is small, even if the threshold distance is set to a small value, this is because a collision between the user and the cleaning device cannot be avoided.

If the area of activity is detected to be not within the preset range, the cleaning device may set the first threshold distance or the second threshold distance to a value that is greater than the preset value (S7050).

In other words, if the area of activity of the user is detected to deviate from the preset range, the cleaning device may set the first threshold value or the second threshold value to a value greater than the preset value. In case the area of activity of the user is large, this is because the collision between the user and the cleaning device can be avoided by setting the threshold distance to a large value.

Figure 8A:
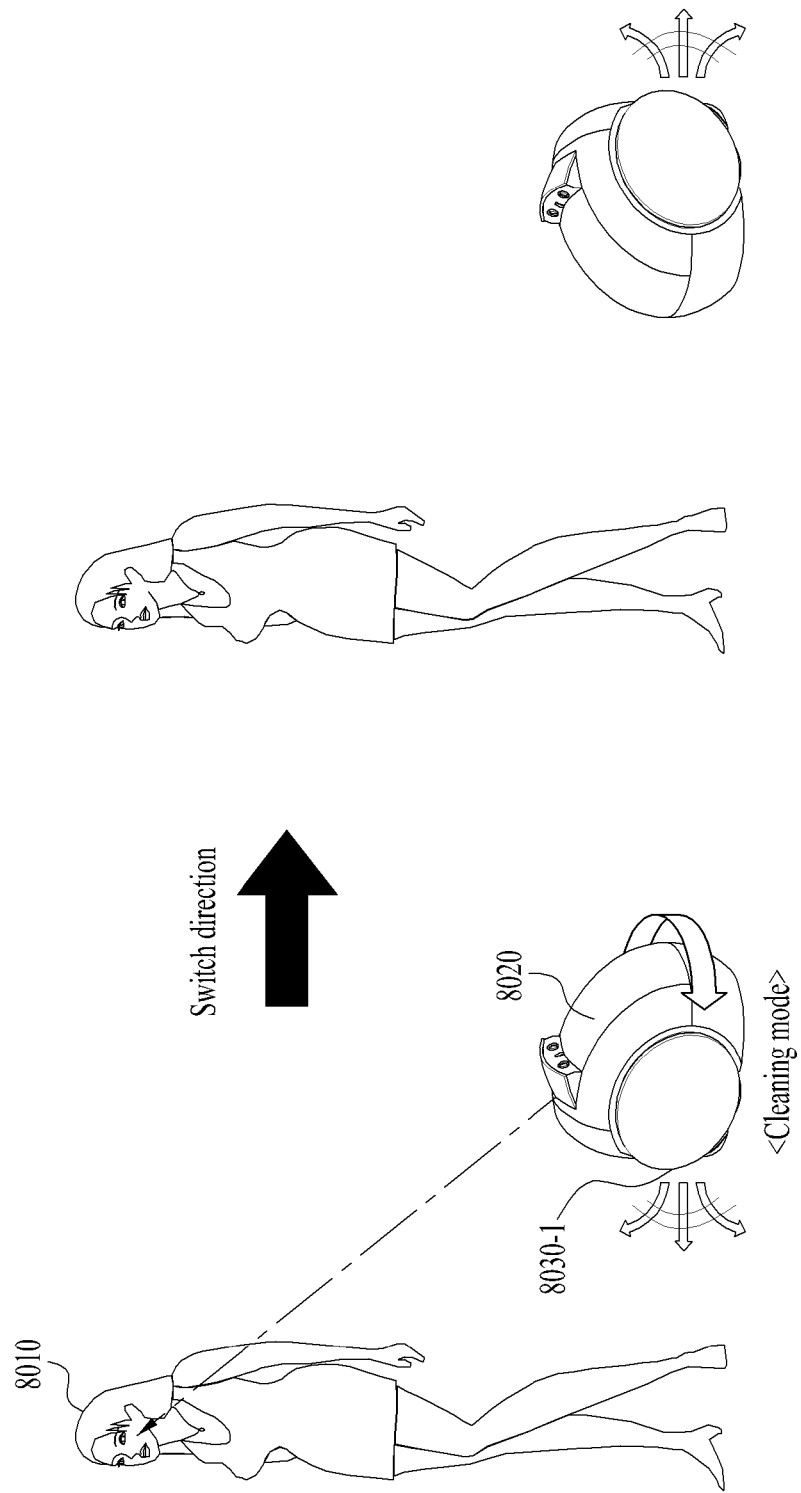
FIG. 8A illustrates a cleaning device that controls a direction of an outlet port in accordance with the cleaning mode of the cleaning device according to the exemplary embodiment of the present invention.

FIG. 8A illustrates a cleaning device that controls a direction of an outlet port in accordance with the cleaning mode of the cleaning device according to the exemplary embodiment of the present invention.

In the cleaning mode, the cleaning device (8020) may control the driving unit, so that the first outlet port (8030-1) does not face into the user (8010). Herein, the first outlet port (8030-1) may represent an outlet port for discharging (or blowing out) air that is generated as a result of performing cleaning to the outside. This is because, even though the air, which is discharged as the result of performing cleaning, has been filtered by a filter, the user (8010) may recognize the discharged air as air including fine dust.

Therefore, by controlling the driving unit so that the air, which is being discharged as a result of performing cleaning, does not directly face the user (8010), the cleaning device (8020) of this specification may allow the user (8010) to recognize that the air including fine dust is not being discharged toward him (or her). In case of performing cleaning, although the cleaning device (8020) of this specification is capable of completely removing dust and even fine dust, in order to eliminate the user's negative perception on the air being discharged when operating in the cleaning mode, the cleaning device (8020) of this specification may perform the operations, which have already been described above.

Accordingly, when the cleaning device (8020) detects the user (8010) in the cleaning mode, the cleaning device (8020) may change the position of the cleaning device (8020) by controlling the driving unit, so that the first outlet port (8030-1) does not face the user (8010). At this point, the cleaning device (8020) may control the driving unit so that the first outlet port (8030-1) faces a direction opposite to the user (8010), thereby allowing the air to be discharged to a most distant location from the user (8010).

Figure 8B:
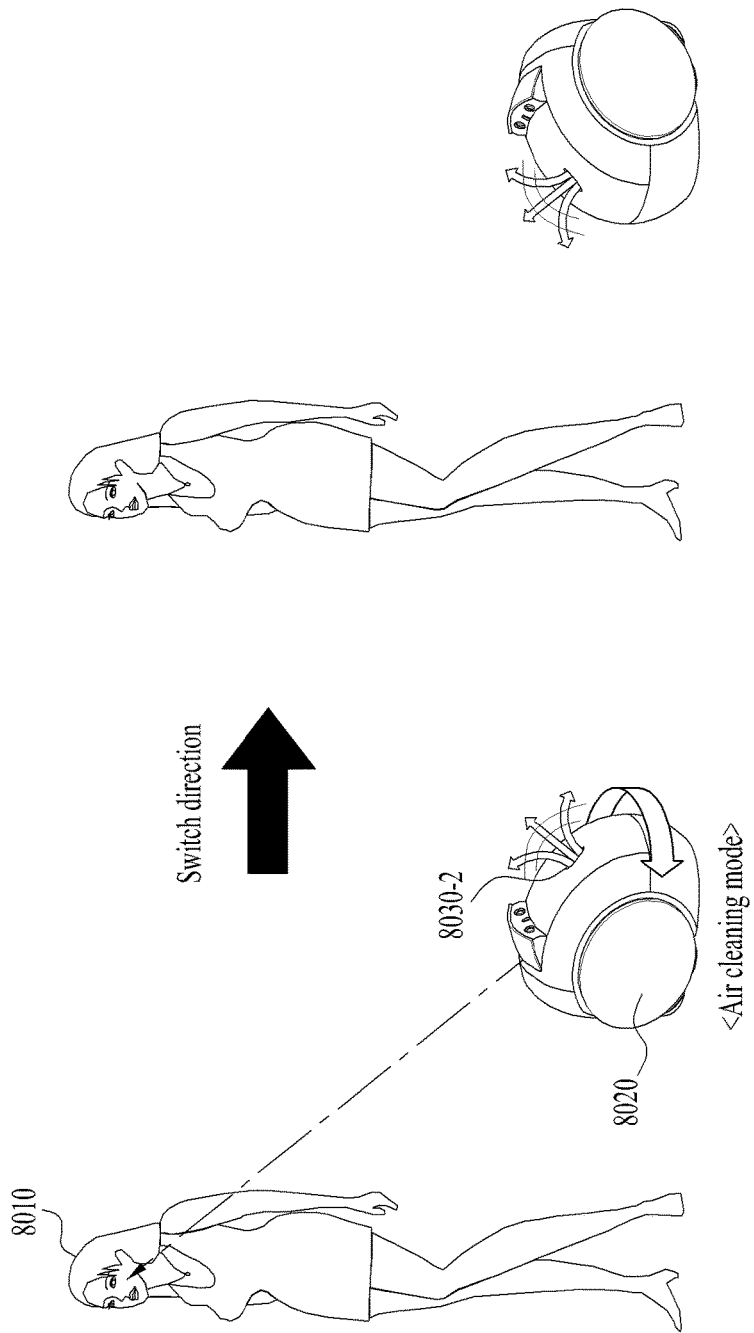
FIG. 8B illustrates a cleaning device that changes a position respective to a user in accordance with the air cleaning mode of the cleaning device according to the exemplary embodiment of the present invention.

FIG. 8B illustrates a cleaning device that changes a position corresponding to a user in accordance with the air cleaning mode of the cleaning device according to the exemplary embodiment of the present invention.

In the air cleaning mode, the cleaning device (8020) may control the driving unit, so that the second outlet port (8030-2) faces into the user (8010). Herein, the second outlet port (8030-2) may represent an outlet port for discharging (or blowing out) air that is generated as a result of performing air cleaning to the outside. This is because the user (8010) may recognize the air, which is discharged as a result of performing air cleaning, as fresh and clean air.

Therefore, by controlling the driving unit so that the air, which is being discharged as a result of performing air cleaning, directly faces the user (8010), the cleaning device (8020) of this specification may allow the user (8010) to recognize that the fresh and clean air is being discharged toward him (or her). Additionally, by actually discharging purified air toward the user (8010), the cleaning device (8020) may directly provide the user (8010) with clean air.

Accordingly, when the cleaning device (8020) detects the user (8010) in the air cleaning mode, the cleaning device (8020) may change the position of the cleaning device (8020) by controlling the driving unit, so that the second outlet port (8030-2) faces into the user (8010).

At this point, the second outlet port (8030-2) may correspond to the same outlet port as to the first outlet port (8030-1), which is described above according to the exemplary embodiment, or may correspond to another outlet port. According to an exemplary embodiment, the second outlet port (8030-2) may correspond to an outlet port other than the first outlet port (8030-1). More specifically, the first outlet port (8030-1) may be equipped to the cleaning device (8020) as an outlet port dedicated to the cleaning mode, and the second outlet port (8030-2) may be equipped to the cleaning device (8020) as an outlet port dedicated to the air cleaning mode. At this point, the first outlet port (8030-1) and the second outlet port (8030-2) may be equipped to the cleaning device (8020) so as to respectively face directions that are opposite to one another.

As another exemplary embodiment, the second outlet port (8030-2) may correspond to the same outlet port as to the first outlet port (8030-1). That is, as the same outlet port, the first outlet port (8030-1) and the second outlet port (8030-2) may be equipped to the cleaning device (8020) as a common outlet port commonly discharging the air generated as a result of performing the cleaning mode and the air generated as a result of performing the air cleaning mode.

Figure 9:
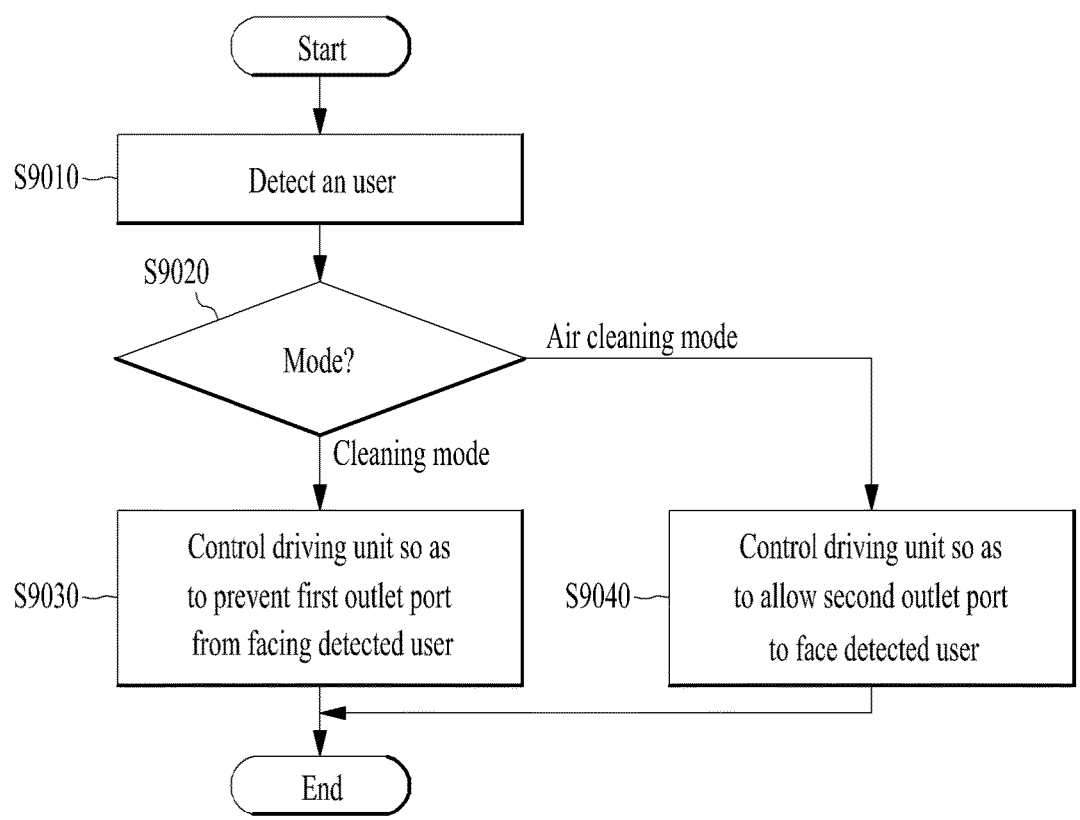
FIG. 9 illustrates a flow chart of a method for controlling a cleaning device that controls a driving unit in accordance with the mode of the cleaning device as the exemplary embodiment of the present invention.

FIG. 9 illustrates a flow chart of a method for controlling a cleaning device that controls a driving unit in accordance with the mode of the cleaning device as the exemplary embodiment of the present invention.

In this flow chart, the detailed description on parts that are similar to or that overlap with the detailed description provided above with reference to FIG. 1 to FIG. 8B will be omitted.

First of all, the cleaning device may detect the user (S9010).

At this point, in addition to the camera unit, the cleaning device may detect the user by using an infrared sensor, a proximity sensor, a heat sensor, a motion sensor, and/or a gesture sensor, and so on.

Subsequently, the cleaning device may detect the operation mode of the cleaning device (S9020).

Herein, the mode may include a cleaning mode and an air cleaning mode. The cleaning device may detect the mode based on a user input respective to the cleaning device and/or received user information. The method for detecting the mode based on the user information will be described in more detail later on with reference to FIG. 10A and FIG. 10B.

If the cleaning mode is detected as the mode of the cleaning device, the cleaning device may control the driving unit, so that the first outlet port does not face into the detected user (S9030).

This is because, if the air being discharged as the result of performing cleaning is directly discharged toward the user, the user may experience an unpleasant feeling, and the respective detailed description has already been described above in detail with reference to FIG. 8a. At this point, the cleaning device may control the driving unit so that the first outlet port faces a direction opposite to the user, thereby allowing the air to be discharged to a most distant location from the user.

If the air cleaning mode is detected as the mode of the cleaning device, the cleaning device may control the driving unit, so that the second outlet port faces into the user (S9040). This is to directly provide the user with purified air by discharging the air being discharged as a result of performing air cleaning toward the user, and the respective detailed description has already been described above in detail with reference to FIG. 8B. At this point, the second outlet port may correspond to the same outlet port as to the first outlet port, which is described above according to the exemplary embodiment, or may correspond to another outlet port.

Figure 10A:
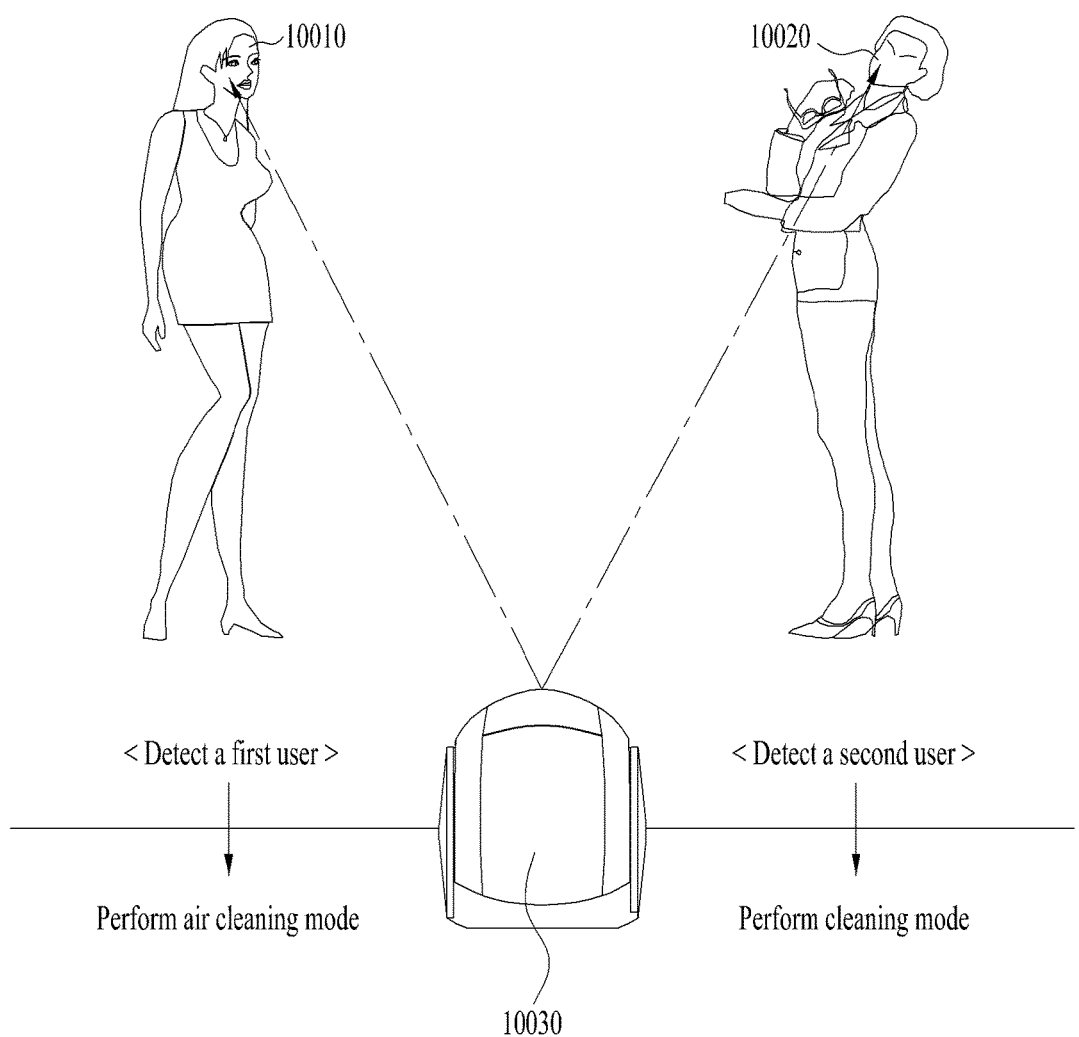
FIG. 10A illustrates a cleaning device that performs a mode by receiving user information according to an exemplary embodiment of the present invention.

FIG. 10A illustrates a cleaning device that performs a mode by receiving user information according to an exemplary embodiment of the present invention.

In this specification, the cleaning device (10030) detects at least one user being positioned within a preset radius and, then, receives user information corresponding to the detected user, thereby allowing the cleaning device (10030) to decide its mode. More specifically, the cleaning device (10030) detects at least one user and receives user information corresponding to the user, and, then, based on the received user information, the cleaning device (10030) may decide the mode of the cleaning device (10030). More specifically, in case the cleaning device (10030) detects a first user (10010) being located with a preset radius, the cleaning device (10030) may receive user information corresponding to the first user (10010). When the first user information is received, the cleaning device (10030) may decide the mode, which the cleaning device (10030) intends to perform, based on the received first user information.

Herein, as the information respective to the detected user, the user information may represent information acting as a basis that allows the cleaning device (10030) to decide its operation mode. The user information may include information on the user, such as medical history, behavior patterns, personality, preferences, age, and so on, of the user. The cleaning device (10030) may provide the user with a user-friendly interface by analyzing the user information and by selecting a mode that is most adequate to be provided to the detected user and performing the selected mode firsthand.

For example, if first user information includes information on the medical history, such as rhinitis (or nasal inflammation) or allergies, and so on, of a first user (10010), the cleaning device (10030) may perform the air cleaning mode firsthand with respect to the first user (10010).

As another example, in case second user information includes information on the personality of a second user (10020) who frequently performs cleaning and organizing, the cleaning device (10030) may perform the cleaning mode firsthand with respect to the second user (10020).

Such user information may be personally inputted by the user or may be generated by the cleaning device (10030), which has recognized the user's behavior patterns. The user information may be stored in a storage unit, which is equipped in the cleaning device (10030), or in a web server. If the user information is stored in a web server, the cleaning device (10030) may receive the user information from the web server by using the communication unit.

If the cleaning device (10030) detects multiple users, the cleaning device (10030) may decide the mode, which is to be performed by the cleaning device (10030), in accordance with priority levels respective to each of the multiple users, and the respective detailed description will be described in more detail later on with reference to FIG. 11A and FIG. 11B.

Figure 10B:
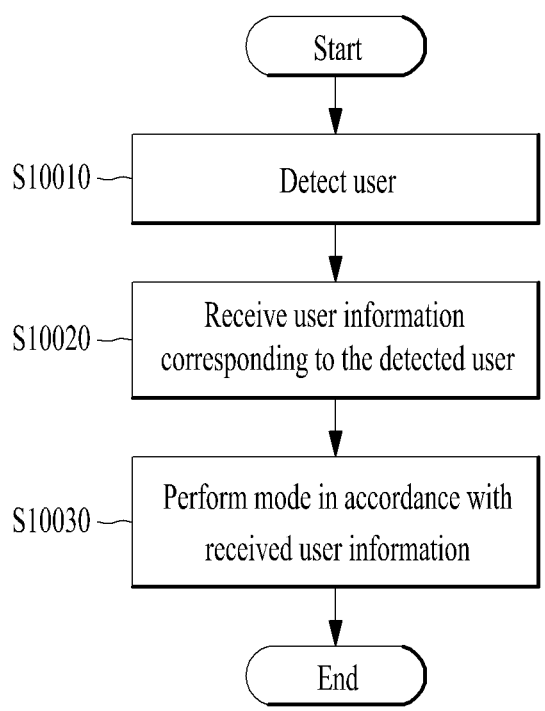
FIG. 10B illustrates a flow chart of a method for controlling a cleaning device that performs a mode by receiving user information according to the exemplary embodiment of the present invention.

FIG. 10B illustrates a flow chart of a method for controlling a cleaning device that performs a mode by receiving user information according to the exemplary embodiment of the present invention. In this flow chart, the detailed description on parts that are similar to or that overlap with the detailed description provided above with reference to FIG. 1 to FIG. 10A will be omitted.

First of all, the cleaning device may detect the user (S10010). At this point, in addition to the camera unit, the cleaning device may detect the user by using an infrared sensor, a proximity sensor, a heat sensor, a motion sensor, and/or a gesture sensor, and so on.

Subsequently, the cleaning device may receive user information respective to the detected user (S10020). Herein, as the information respective to the detected user, the user information may represent information acting as a basis that allows the cleaning device to decide its operation mode. The user information may include information on the user, such as medical history, behavior patterns, personality, preferences, age, and so on, of the user. According to the exemplary embodiment, the cleaning device may receive the user information from a web server and/or a storage unit.

Thereafter, the cleaning device may perform a mode in accordance with the received user information (S10030). More specifically, the cleaning device may analyze the received user information and decide a mode that is most adequate to be performed for the detected user, and, then, the cleaning device may perform the corresponding mode. Thus, the cleaning device may selectively provide modes that are most adequate to be performed for each user. The respective detailed description will be described in more detail later on with reference to FIG. 10A.

Figure 11A:
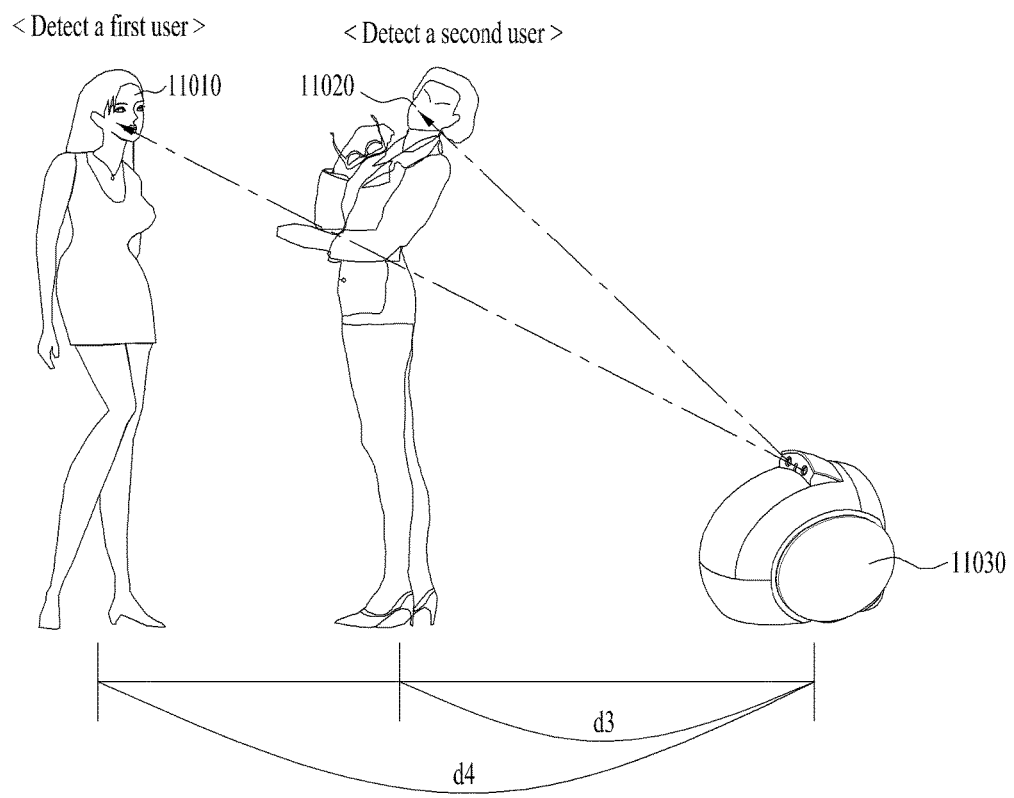
FIG. 11A illustrates a cleaning device that decides the mode that is to be performed with respect to priority levels of multiple users, when the cleaning device detects multiple users, according to an exemplary embodiment of the present invention.

FIG. 11A illustrates a cleaning device that decides the mode that is to be performed with respect to priority levels of multiple users, when the cleaning device detects multiple users, according to an exemplary embodiment of the present invention.

The cleaning device (11030) detects at least one user being positioned within a preset radius. At this point, in case multiple users are positioned within the preset radius, the cleaning device (11030) may detect multiple users. At this point, the cleaning device (11030) may assign priority levels respective to each of the users by using diverse methods, and, then, the cleaning device (11030) may decide the mode that is to be performed in accordance with the assigned priority levels.

As an exemplary embodiment, the cleaning device (11030) may assign priority levels in accordance with distances between each of the multiple users and the cleaning device (11030). More specifically, the cleaning device (11030) may assign priority levels with respect to each user based on the distances between the cleaning device (11030) and each user.

For example, the cleaning device (11030) may assign a higher priority level to the user being positioned at a location most approximate to the cleaning device (11030). Accordingly, as shown in the drawing, in case the cleaning device (11030) detects a first user (11010) being positioned at a fourth distance (d4) and a second user (11020) being positioned at a third distance (d3), the cleaning device (11030) may assign a higher priority level to the second user (11020), who is positioned at a closer distance from the cleaning device (11030), as compared to the first user (11010). Accordingly, the cleaning device (11030) may decide the mode that is to be performed by considering second user information respective to the second user (11020) at a priority level that is higher than first user information respective to the first user (11010). The method for deciding the mode that is to be performed by using user information has already been described above with reference to FIG. 10A and FIG. 10B.

As another exemplary embodiment, the cleaning device (11030) may assign priority levels based on the user information respective to each user. In this exemplary embodiment, the user information may include information related to the priority level of each user. Such user information may be personally inputted by the user or may be generated by the cleaning device (11030), which has analyzed the user's behavior pattern.

For example, as information related to the priority levels, each set of user information may include information on a required operation time. Herein, the required operation time may refer to time periods required for completing the performance of operation modes respective to each user.

The cleaning device (11030) may decide the priority levels in accordance with such required operation time. More specifically, by comparing the required operation time respective to each user included in each set of user information, the cleaning device (11030) may assign the priority levels respective to each user. The cleaning device (11030) may assign higher priority levels to users having shorter required operation time, and the cleaning device (11030) may assign lower priority levels to users having longer required operation time.

Based on the priority levels that are assigned as described above, the cleaning device (11030) may decide the mode that is to be performed with respect to the user having the higher priority level. More specifically, the cleaning device (11030) may decide the mode that is to be performed by considering the user information in accordance with an order of users having the higher priority levels. The method for deciding the mode that is to be performed by using user information has already been described above with reference to FIG. 10A and FIG. 10B.

If the mode performance is completed, the cleaning device (11030) may perform cleaning or air cleaning with respect to the user being assigned with the next priority level in accordance with the user information.

Meanwhile, although it is not shown in this drawing, the cleaning device (11030) may simultaneously perform the same mode or a different mode with respect to multiple users.

In case of performing the same mode with respect to multiple users, the cleaning device (11030) may perform the corresponding mode after moving around in consideration of the locations of each user. For example, in case a first user (11010) and a second user (11020) for whom the air cleaning mode is to be performed are detected at the same time in accordance with each user information, the cleaning device (11030) may supply both the first user (11010) and the second user (11020) with purified air at the same time, by moving to an optimal location for providing clean air to both users and by performing the air cleaning mode. At this point, as the optimal location, the cleaning device (11030) may perform air cleaning by moving to a mid-point location between the first user (11010) and the second user (11020). Alternatively, the cleaning device (11030) may set up different air cleaning locations for each of the two users.

Alternatively, the cleaning device (11030) may set up a first air cleaning location with respect to the first user (11010) and may set up a second air cleaning location with respect to the second user (11020). The cleaning device (11030) may move to and from the first air cleaning location and the second air cleaning location, which are set up as described above, and may alternately provide the first user (11010) and the second user (11020) with clean air.

Although the cleaning device (11030) performs different modes with respect to multiple users, the cleaning device (11030) may perform different modes by moving around with respect to the locations of each user.

For example, if the cleaning device (11030) is required to perform the cleaning mode with respect to the first user (11010) and to perform the air cleaning mode with respect to the second user (11020), the cleaning device (11030) may set up mode performing locations for each user, and, then, the cleaning device (11030) may alternately perform the two modes with respect to the first user (11010) and the second user (11020) by moving to and from the corresponding locations.

As described above, the cleaning device (11030) of this specification is capable of performing user-adaptive operations by performing the cleaning mode and the air cleaning mode while considering the user information and priority levels respective to multiple users.

FIG. 11B illustrates a flow chart of a method for controlling a cleaning device that decides the mode that is to be performed with respect to priority levels of multiple users, when the cleaning device detects multiple users, according to an exemplary embodiment of the present invention. In this flow chart, the detailed description on parts that are similar to or that overlap with the detailed description provided above with reference to FIG. 1 to FIG. 11A will be omitted.

First, the cleaning device may detect the first user and the second user (S11010). More specifically, the cleaning device may detect multiple users positioned within a preset radius based on the current location of the cleaning device. In this specification, for simplicity in the description, detailed description will be provided based on a case when two users are positioned within a preset radius. At this point, in addition to the camera unit, the cleaning device may detect the user by using an infrared sensor, a proximity sensor, a heat sensor, a motion sensor, and/or a gesture sensor, and so on.

Subsequently, the cleaning device may determine whether the priority level of the first user is higher than the priority level of the second user (S11020). The priority level of a user may be decided based on distances between the cleaning device and each user and/or user information respective to each user. Herein, the user information may include information related to the priority level of each user. Such user information may be personally inputted by the user or may be generated by the cleaning device, which has analyzed the user's behavior pattern.

As an exemplary embodiment, the user information may include information on a required operation time. The respective detailed description has already been described above in detail with reference to FIG. 11A.

If the priority level of the first user is higher than the priority level of the second user, the cleaning device may perform a first mode in accordance with first user information (S11030). Herein, the first mode may indicate a mode that is to be performed with respect to the first user based on the first user information. The detailed information on the exemplary embodiment of the cleaning device, which decides the mode that is to be performed based on the user information, has already been described above in detail with reference to FIG. 10A and FIG. 10B.

If the priority level of the first user is not higher than the priority level of the second user, the cleaning device may perform a second mode in accordance with second user information (S11040). In other words, in case the priority level of the second user is higher than the priority level of the first user, the cleaning device may perform the second mode in accordance with the second user information. Herein, the second mode may indicate a mode that is to be performed with respect to the second user based on the second user information. The detailed information on the exemplary embodiment of the cleaning device, which decides the mode that is to be performed based on the user information, has already been described above in detail with reference to FIG. 10A and FIG. 10B.

Meanwhile, although it is not shown in this flow chart, the cleaning device may simultaneously perform the same mode or a different mode with respect to multiple users. At this point, the cleaning device may set up locations where the respective mode is to be performed based on the locations of the multiple users. The respective detailed description has already been described above in detail with reference to FIG. 11B.

Figure 12A:
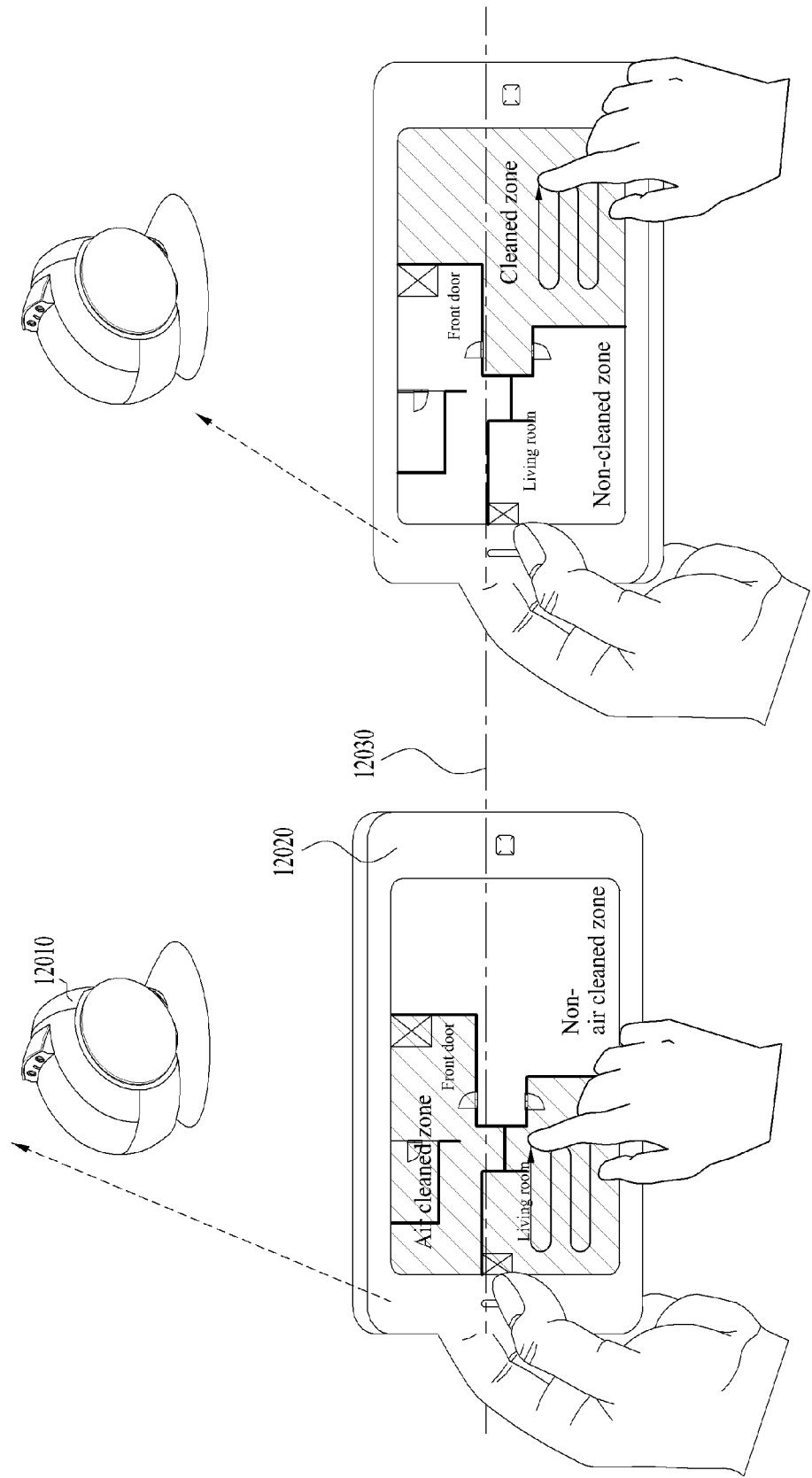
FIG. 12A and FIG. 12B illustrate exemplary embodiments for controlling a cleaning device by using an external device.
Figure 12B:
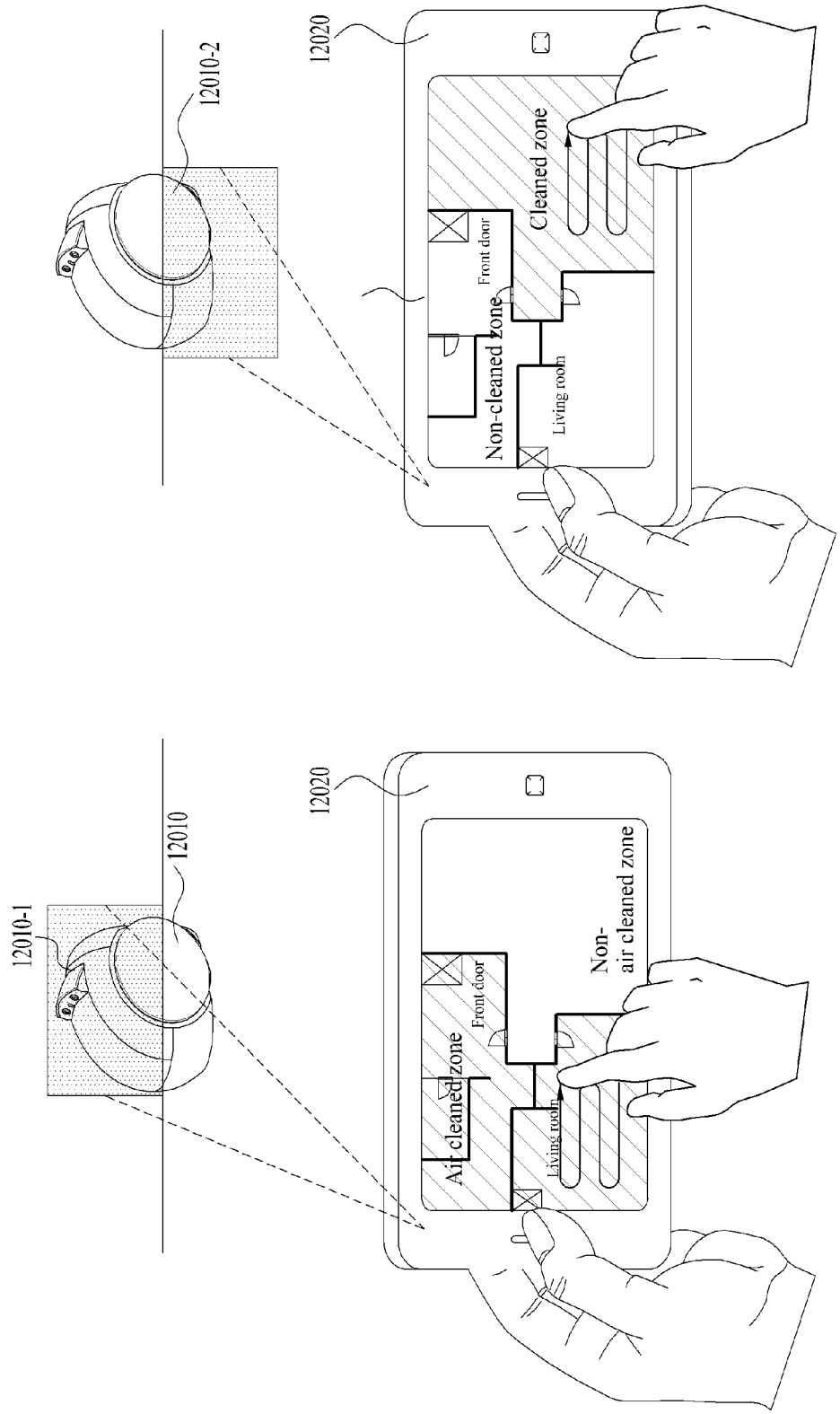

FIG. 12A and FIG. 12B illustrate exemplary embodiments for controlling a cleaning device by using an external device.

According to the exemplary embodiment, the cleaning device (12010) of this specification may operate in connection with an external device (12020). At this point, by performing communication by using the communication unit, the cleaning device (12010) may transmit/receive diverse information to/from the external device (12020).

More specifically, the cleaning device (12010) may transmit first information respective to the cleaning mode and/or second information respective to the air cleaning mode to the external device (12020). The cleaning device (12010) may transmit the first information and/or the second information in accordance with a mode information request signal transmitted from the external device (12020). Alternatively, the cleaning device (12010) may transmit the mode information to the external device (12020) in real time while performing each mode, or, in case the performance of each mode is completed, the cleaning device (12010) may automatically transmit the mode information to the external device (12020).

In this instance, the first information may include diverse information on the cleaning mode of the cleaning device (12010). More specifically, the first information may include map information of a cleaning zone, cleaning-completed zone (or cleaned zone) information indicating which zone in the corresponding map has been cleaned, and cleaning path information indicating the path in the corresponding map along which the cleaning has been performed.

In addition to this, the first information may include information on a zone that is scheduled for cleaning, wherein the information indicates where the cleaning device (12010) is scheduled to perform cleaning later on, cleaning command information, and pollution level information within a map, and so on. Herein, the pollution level information may include information on past pollution levels and current pollution levels of each area within the map.

Additionally, the second information may include diverse information on the air cleaning mode of the cleaning device (12010). More specifically, the second information may include map information of an air cleaning zone, air-cleaning-completed zone (or air-cleaned zone) information indicating which zone in the corresponding map has been air-cleaned, and air cleaning path information indicating the path in the corresponding map along which the air cleaning has been performed. In addition to this, the second information may include information on a zone that is scheduled for air cleaning, wherein the information indicates where the cleaning device (12010) is scheduled to perform air cleaning later on, air cleaning command information, information indicating a zone in the corresponding map in which the cleaning device (12010) has remained and a time period during which the cleaning device (12010) has remained there, and air pollution level information within a map, and so on. Herein, the air pollution level information may include information on past air pollution levels and current air pollution levels of each area within the map.

Depending on the state of the external device (12020), the external device (12020) may display the first information and/or the second information, which are/is received from the cleaning device (12010). More specifically, in case the external device (12020) has detected a first state, the external device (12020) may display the first information, and, in case the external device (12020) has detected a second state, the external device (12020) may display the second information. The state of the external device (12020) may be decided in accordance with a tilting (or inclination) of the external device (12020) or an image of the cleaning device (12010).

As an exemplary embodiment, as shown in FIG. 12A, the external device (12020) may detect a state, wherein an upper portion of the external device (12020) is tilted outward based on a horizontal center line of the external device (12020), as the first state. In other words, the external device (12020) may detect a state, wherein the upper portion of the external device (12020) is tilted downward, as the first state. This is because a dust intake port of the cleaning device (12010) is positioned on a lower portion of the cleaning device (12010).

That is, if the external device (12020) faces a part that is associated with the cleaning mode of the cleaning device (12010) or a direction that is associated with the cleaning mode of the cleaning device (12010), the external device (12020) may detect the first state and may display the first information accordingly.

In the same context, the external device (12020) may detect a state, wherein an upper portion of the external device (12020) is tilted inward based on a horizontal center line of the external device (12020), as the second state. In other words, the external device (12020) may detect a state, wherein the upper portion of the external device (12020) is tilted upward, as the second state.

This is because an air intake port of the cleaning device (12010) is positioned on an upper portion of the cleaning device (12010). That is, if the external device (12020) faces a part that is associated with the air cleaning mode of the cleaning device (12010) or a direction that is associated with the air cleaning mode of the cleaning device (12010), the external device (12020) may detect the second state and may display the second information accordingly.

As another exemplary embodiment, as shown in FIG. 12B, the external device (12020) may detect a state, wherein a lower-side image (12010-2) of the cleaning device (12010) is detected, as the first state. At this point, the external device (12020) may detect the lower-side image (12010-2) of the cleaning device (12010) by using at least one camera sensor.

This is because a dust intake port of the cleaning device (12010) is positioned on a lower portion of the cleaning device (12010). That is, if the external device (12020) detects an image (12010-2) of a part that is associated with the cleaning mode of the cleaning device (12010), the external device (12020) may detect the first state and may display the first information accordingly.

In the same context, the external device (12020) may detect a state, wherein an upper-side image (12010-1) of the cleaning device (12010) is detected, as the second state. At this point, the external device (12020) may detect the upper-side image (12010-1) of the cleaning device (12010) by using at least one camera sensor, and this has already been described above. This is because an air intake port of the cleaning device (12010) is positioned on an upper portion of the cleaning device (12010).

That is, if the external device (12020) detects an image (12010-1) of a part that is associated with the cleaning mode of the air cleaning device (12010), the external device (12020) may detect the second state and may display the second information accordingly.

In case of detecting the first state and displaying the first information, the external device (12020) may display a map of the cleaning zone, and, then, the external device (12020) may display a path within the corresponding map along which the cleaning device (12010) has moved. Also, the external device (12020) may additionally display a zone that is scheduled to be cleaned later on by the cleaning device (12010) and/or a scheduled cleaning path.

Furthermore, the external device (12020) may additionally display polluted areas and cleaned areas within the corresponding map. In addition to this, the external device (12020) may display information related to the cleaning mode that is included in the first information according to diverse exemplary embodiments.

Additionally, in case of detecting the second state and displaying the second information, the external device (12020) may display a map of the air cleaning zone, and, then, the external device (12020) may display a path within the corresponding map along which the cleaning device (12010) has moved. Also, the external device (12020) may additionally display a zone that is scheduled to be air-cleaned later on by the cleaning device (12010) and/or a scheduled air cleaning path.

Moreover, the external device (12020) may additionally display polluted areas and purified (or air-cleaned) areas within the corresponding map. Furthermore, the external device (12020) may additionally display an indicator within the map, wherein the indicator indicates in which location and a period of time during which the cleaning device (12010) has performed air cleaning. In addition to this, the external device (12020) may display information related to the air cleaning mode that is included in the second information according to diverse exemplary embodiments.

Furthermore, although it is not shown in this drawing, the external device (12020) may display the first information and/or the second information as an Augmented Reality (AR) image.

The user may control the cleaning device (12010) by using the external device (12020), which provides the mode information of the cleaning device (12010). The user may be provided with diverse information associated with the cleaning mode and the air cleaning mode through the external device (12020), and, then, based on the provided information, the user may change the mode of the cleaning device (12010) or may give diverse commands associated with the mode.

For example, the user may change the mode that is currently being carried out to another mode through the external device (12020). At this point, the external device (12020) may transmit a mode switch command to the external device (12020), and the cleaning device (12010), which has received the mode switch command, may switch the mode that is currently being carried out to another mode.

As another example, the user recognizes an operation state and a movement path of the cleaning device (12010) through the external device (12020), and, then, the user may change the operation state of the cleaning device (12010) or may designate or change the movement path, as shown in the drawing. The external device (12020) may transmit a control command to the cleaning device (12010), and, herein, the control command may include a command for changing the operation state of the cleaning device (12010) or a command for designating and changing the movement path of the cleaning device (12010).

The cleaning device (12010) may perform cleaning or air cleaning by changing the operation state of the cleaning device (12010) in accordance with the control command received from the external device (12020) or by moving around in accordance with the designated or changed movement path.

Figure 13:
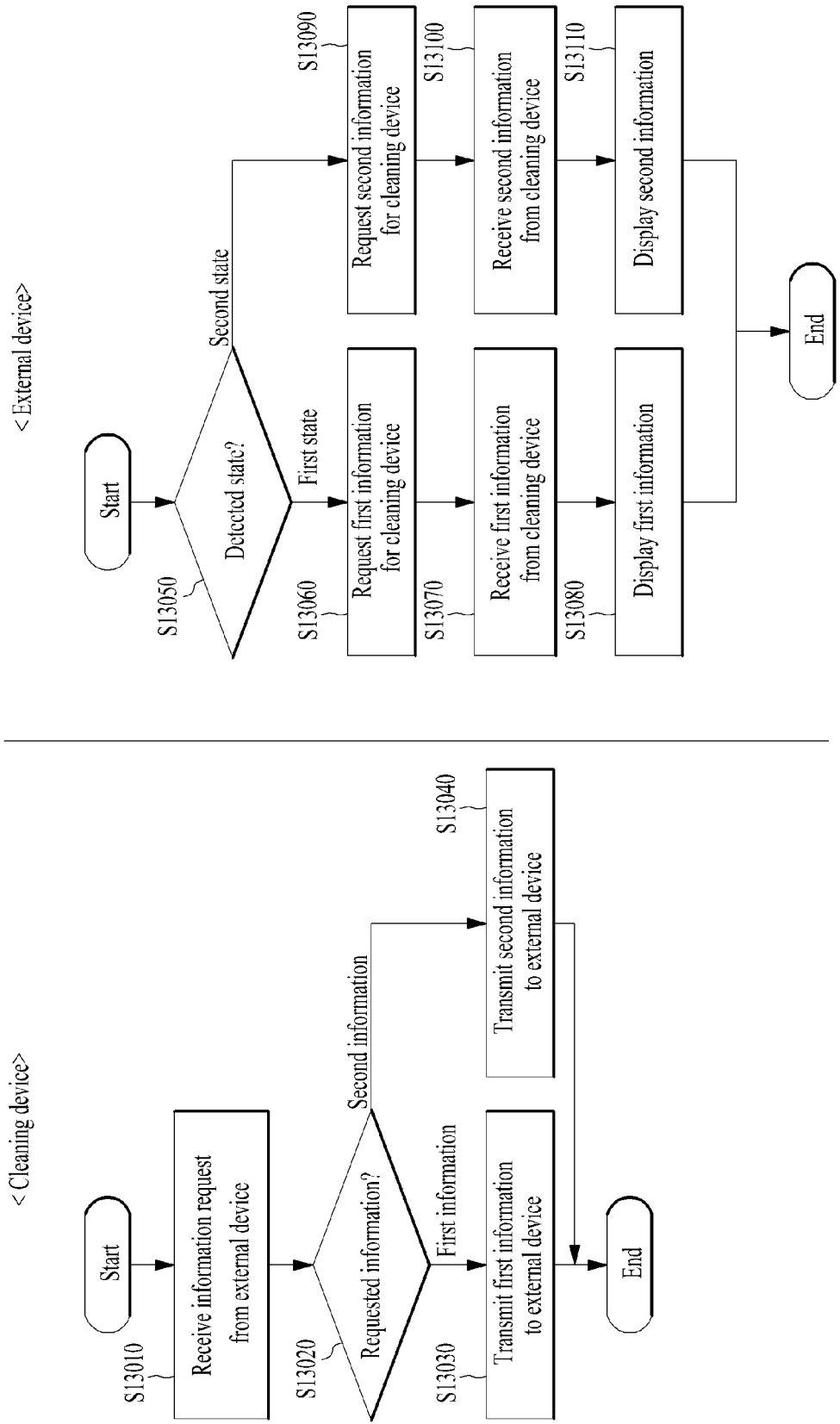
FIG. 13 illustrates a flow chart of a method for controlling a cleaning device and an external device that can transmit and/or receive mode information according to an exemplary embodiment of the present invention.

FIG. 13 illustrates a flow chart of a method for controlling a cleaning device and an external device that can transmit and/or receive mode information according to an exemplary embodiment of the present invention. In this flow chart, the detailed description on parts that are similar to or that overlap with the detailed description provided above with reference to FIG. 1 to FIG. 12B will be omitted.

First of all, the cleaning device may receive an information request from the external device (S13010). More specifically, the cleaning device may receive a mode information request signal from the external device. At this point, the cleaning device may receive the mode information request signal from the external device by using the communication unit, which is equipped in the cleaning device.

However, this step corresponds to a step that can be selectively (or optionally) applied in accordance with the exemplary embodiment, and, therefore, the cleaning device may be capable of transmitting mode information in real time to the external device even if there is no mode information request from the external device, or, when the mode performance is completed, the cleaning device may automatically transmit the mode information to the external device.

Next, the cleaning device may determine what type of information the information requested by the external device corresponds to (S13020). Herein, the information may include the first information and the second information, and the first information may indicate information associated with the cleaning mode, and the second information may indicate information associated with the air cleaning mode.

If the information requested by the external device corresponds to the first information, the cleaning device may transmit the first information to the external device (S13030). The first information may include at least one of map information of a cleaning zone, cleaning-completed zone (or cleaned zone) information, information on a zone that is scheduled for cleaning, cleaning path information, cleaning command information, and pollution level information.

If the information requested by the external device corresponds to the second information, the cleaning device may transmit the second information to the external device (S13040). The second information may include at least one of map information of an air cleaning zone, air-cleaning-completed zone (or air-cleaned zone) information, information on a zone that is scheduled for air cleaning, air cleaning path information, air cleaning command information, and pollution level information.

Meanwhile, the external device may detect a state of the external device (S13050). Herein, the state of the external device may be decided in accordance with a tilting (or inclination) of the external device or an image of the cleaning device.

If the first state is detected, the external device may request the first information for the cleaning device (S13060). More specifically, in case the first state is detected, the external device may transmit a signal requesting for the first information to the cleaning device.

As an exemplary embodiment, the external device may detect a state, wherein an upper portion of the external device is tilted outward based on a horizontal center line of the external device, as the first state.

As another exemplary embodiment, the external device may detect a state, wherein a lower-side image of the cleaning device is detected, as the first state. The above-mentioned exemplary embodiments have already been described above in detail with reference to FIG. 12A and FIG. 12B.

Meanwhile, this step corresponds to a step that can be selectively (or optionally) applied in accordance with the exemplary embodiment, and, therefore, the external device may receive mode information in real time from the cleaning device without having to request for the mode information to the cleaning device, or, when the mode performance of the cleaning device is completed, the external device may automatically receive the mode information from the cleaning device.

Next, the external device may receive the first information from the cleaning device (S13070).

Subsequently, the external device may display the received first information (S13080). For example, the external device may display a map of the cleaning zone, and, then, the external device may display a path within the corresponding map along which the cleaning device has moved.

In addition to this, the external device may display information related to the cleaning mode that is included in the first information according to diverse exemplary embodiments. The respective detailed description has already been described above in detail with reference to FIG. 12*a* and FIG. 12*b*.

In step S13050, if the second state is detected, the external device may request the second information for the cleaning device (S13090).

More specifically, in case the second state is detected, the external device may transmit a signal requesting for the second information to the cleaning device. As an exemplary embodiment, the external device may detect a state, wherein an upper portion of the external device is tilted inward based on a horizontal center line of the external device, as the second state.

As another exemplary embodiment, the external device may detect a state, wherein an upper-side image of the cleaning device is detected, as the second state. The above-mentioned exemplary embodiments have already been described above in detail with reference to FIG. 12A and FIG. 12B.

Meanwhile, this step corresponds to a step that can be selectively (or optionally) applied in accordance with the exemplary embodiment, and, therefore, the external device may receive mode information in real time from the cleaning device without having to request for the mode information to the cleaning device, or, when the mode performance of the cleaning device is completed, the external device may automatically receive the mode information from the cleaning device.

Next, the external device may receive the second information from the cleaning device (S13100).

Subsequently, the external device may display the received second information (S13110). For example, the external device may display a map of the air cleaning zone, and, then, the external device may display a path within the corresponding map along which the cleaning device has moved.

In addition to this, the external device may display information related to the air cleaning mode that is included in the second information according to diverse exemplary embodiments. The respective detailed description has already been described above in detail with reference to FIG. 12A and FIG. 12B.

Meanwhile, although it is not shown in this flow chart, the user may control the cleaning device through the external device. The user may transmit diverse control commands, such as switch mode, change operation zone, change movement path, and so on, through the external device. The respective detailed description has already been described above in detail with reference to FIG. 12A and FIG. 12B.

Although the drawings have been distinguished and divided in order to facilitate the description of the present invention, the present invention may provide a design for configuring a new embodiment by combining some of the previously described embodiments of the present invention. Moreover, whenever required by anyone skilled in the art, the scope of the present invention includes designing a recording medium readable by a computer, the computer having a program for executing the above-described embodiments of the present invention recorded therein.

Additionally, as described above, the cleaning device and the control method therefor of this specification may not be limited only to the above-described configuration and methods according to the exemplary embodiments of the present invention, and, therefore, variations of the exemplary embodiments of the present invention may be configured by selectively combining each exemplary embodiment of the present invention fully or in part.

Also, it will be apparent to those skilled in the art that various modifications and variations can be made in this specification without departing from the spirit or scope of this specification. Thus, it is intended that this specification covers the modifications and variations of this specification provided they come within the scope of the appended claims and their equivalents. It is also apparent that such variations of this specification are not to be understood individually or separately from the technical scope or spirit of this specification.

Furthermore, the cleaning device and the control method therefor of this specification may be realized as a code that can be read by a processor, which is provided in a network device, in a recording medium that can be read by a processor. The recording medium that can be read by the processor includes all types of recording devices storing data that can be read by the processor. Examples of the recording media that can be read by a processor may include ROMs, RAMs, magnetic tapes, floppy disks, optical data storing devices, and so on. Also, an exemplary recording medium being realized in the form of a carrier wave, such as a transmission via Internet, may also be included. Also, the recording medium that can be read by a processor may be scattered within a computer system, which is connected through a network. And, a code that can be read by the processor may be stored and executed by using a dispersion (or scattering) method.

Additionally, the distance, radius, and direction mentioned in this specification may not only signify respective accurate values but may also be viewed as including actual distance, radius, and direction of a preset range. More specifically, the distance, radius, and direction mentioned in this specification may signify the actual distance, radius, and direction mentioned, and differences within a preset range may exist herein.

Also, a device invention and a method invention are both described in this specification. Therefore, whenever required, the description of both inventions may be supplementarily applied.

MODE FOR CARRYING OUT THE PRESENT INVENTION

As described above, the related details have been described in the best mode for carrying out the present invention.

INDUSTRIAL APPLICABILITY

As described above, the present invention may be applied fully, or in part, to cleaning devices.

What is claimed is:
1. A cleaning device comprising:
   a camera unit configured to capture images;
   a cleaning unit configured to perform cleaning in a cleaning mode;
   an air cleaning unit configured to perform air cleaning in an air purifying mode;
   a first outlet port configured to discharge air being sucked in by the cleaning unit;
   a second outlet port configured to discharge air being sucked in by the air cleaning unit;
   a driving unit configured to move the cleaning device; and
   a processor configured to control the camera unit, the cleaning unit, the air cleaning unit, the first outlet port, the second outlet port and the driving unit,
   wherein the processor is further configured to:
   detect a user by using the camera unit,
   control the driving unit to move the cleaning device from a current location to a location at a distance from the user that exceeds a first threshold distance if the cleaning device is in the cleaning mode,
   control the driving unit to move the cleaning device from the current location to a location at a distance from the user that is within a second threshold distance if the cleaning device is in the air purifying mode, and
   control the driving unit, based on a direction in which the first outlet port is facing relative to the user, to prevent the first outlet port from facing the user if the cleaning device is in the cleaning mode.

2. The cleaning device of claim 1, wherein the processor is further configured to set up the first threshold distance and the second threshold distance based on an area of activity of the user determined by the processor.

3. The cleaning device of claim 2, wherein, if the area of activity is within a preset range, the first threshold distance or the second threshold distance is set to be smaller than a preset value, or
   wherein, if the area of activity deviates from the preset range, the first threshold distance or the second threshold distance is set to be greater than the preset value.

4. The cleaning device of claim 1, wherein the second threshold distance is equal to the first threshold distance.

5. The cleaning device of claim 1, wherein the processor is further configured to:
   receive user information respective to the user, and
   perform the cleaning mode or the air purifying mode by using the received user information.

6. The cleaning device of claim 1, wherein the processor is further configured to:
   receive user information respective to each of multiple users detected by using the camera,
   determine priority levels respective to each of the multiple users using the user information and a respective distance from each of the multiple users to the cleaning device, wherein a user among the multiple users at a shortest distance from the cleaning device is determined to have a highest priority level among the multiple users,
   cause the cleaning unit to perform cleaning with respect to the user among the multiple users determined to have the highest priority level, and
   cause the air cleaning unit to perform air cleaning with respect to the user among the multiple users determined to have the highest priority level.

7. The cleaning device of claim 1, wherein, the processor is configured to:
   cause the cleaning unit to perform cleaning based on an order of users detected by using the camera, wherein the order of the users is determined based on respective distances of the users from the cleaning device, and
   cause the air cleaning unit to perform air cleaning based on the order of the users.

8. The cleaning device of claim 1, wherein the processor is configured to control the driving unit such that the second outlet port faces the detected user if the cleaning device is in the air purifying mode.

9. The cleaning device of claim 1, wherein the first outlet port and the second outlet port face opposite directions to one another.

10. The cleaning device of claim 1, wherein the first outlet port is the same outlet port as the second outlet port, and
wherein the processor is further configured to:
control the driving unit so as to prevent the first outlet port and the second outlet port from facing the user if the cleaning device is in the cleaning mode, and
control the driving unit so as to allow the first outlet port and the second outlet port to face the detected user if the cleaning device is in the air purifying mode.

11. The cleaning device of claim 1, further comprising:
a communication unit configured to transmit information to an external device and receive information from the external device, and
wherein the processor is configured to:
cause the communication unit to transmit first information and second information to the external device,
wherein the first information is associated with the cleaning mode,
wherein the second information is associated with the air purifying mode.

12. The cleaning device of claim 11, wherein the first information includes at least one of map information of a cleaning zone, cleaning-completed zone (or cleaned zone) information, information on a zone that is scheduled for cleaning, cleaning path information, cleaning command information, and pollution level information.

13. The cleaning device of claim 11, wherein the second information includes at least one of map information of an air cleaning zone, air-cleaning-completed zone (or air-cleaned zone) information, information on a zone that is scheduled for air cleaning, air cleaning path information, air cleaning command information, and pollution level information.

14. The cleaning device of claim 11, wherein, the external device is further configured to:
display the first information if a first state of the external device is detected, and
display the second information if a second state of the external device is detected.

* * * * *